United States Patent
Underbrink et al.

(10) Patent No.: US 7,711,038 B1
(45) Date of Patent: May 4, 2010

(54) SYSTEM AND METHOD FOR DESPREADING IN A SPREAD SPECTRUM MATCHED FILTER

(75) Inventors: Paul A. Underbrink, Lake Forest, CA (US); Steven A. Gronemyer, Cedar Rapids, IA (US)

(73) Assignee: SiRF Technology, Inc., Santa Clara, CA (US)

( * ) Notice: Subject to any disclaimer, the term of this patent is extended or adjusted under 35 U.S.C. 154(b) by 1570 days.

(21) Appl. No.: 09/604,595

(22) Filed: Jun. 27, 2000

Related U.S. Application Data

(63) Continuation of application No. 09/498,893, filed on Feb. 7, 2000, which is a continuation-in-part of application No. 09/145,055, filed on Sep. 1, 1998, now Pat. No. 6,044,105.

(51) Int. Cl.
*H04B 1/00* (2006.01)

(52) U.S. Cl. .................. 375/152; 375/130; 375/136; 375/142; 375/143; 375/144; 375/147; 375/148; 375/149; 375/150; 375/151

(58) Field of Classification Search ......... 375/130–153; 341/50; 370/335, 342
See application file for complete search history.

(56) References Cited

U.S. PATENT DOCUMENTS

| | | | | |
|---|---|---|---|---|
| 3,604,911 | A | 9/1971 | Schmitt | 235/181 |
| 3,975,628 | A | 8/1976 | Graves et al. | 250/199 |
| 4,426,712 | A | 1/1984 | Gorski-Popiel | 375/96 |
| 4,445,118 | A | 4/1984 | Taylor et al. | 343/357 |
| 4,463,357 | A | 7/1984 | MacDoran | 343/460 |
| 4,485,477 | A | 11/1984 | Nossen | |
| 4,578,678 | A | 3/1986 | Hurd | 343/357 |
| 4,667,203 | A | 5/1987 | Counselman, III | 342/357 |
| 4,701,934 | A | 10/1987 | Jasper | 375/1 |
| 4,754,465 | A | 6/1988 | Trimble | 375/1 |
| 4,785,463 | A | 11/1988 | Janc et al. | 375/1 |
| 4,809,005 | A | 2/1989 | Counselman, III | 342/352 |
| 4,821,294 | A | 4/1989 | Thomas, Jr. | 375/96 |
| 4,890,233 | A | 12/1989 | Ando et al. | 364/457 |

(Continued)

FOREIGN PATENT DOCUMENTS

EP 0639901 A2 2/1995

(Continued)

OTHER PUBLICATIONS

D.J.R. Van Nee and A.J.R.M. Coenen, "New Fast GPS Code-Acquisition Technique Using FFT," Jan. 17, 1991, *Electronics Letters*, vol. 27, No. 2.

(Continued)

*Primary Examiner*—Curtis B Odom
(74) *Attorney, Agent, or Firm*—Pillsbury Winthrop Shaw Pittman LLP

(57) ABSTRACT

Implementation of an improved matched filter system for despreading a PN code from a spread spectrum signal utilizes a matched filter system that may be broadly conceptualized as a system that optimizes the number of multipliers and adders utilized by the system in despreading a PN code from a spread spectrum signal. This lowers the power consumption of the improved matched filter system and increases the speed at which the system despreads the PN code from the spread spectrum signal.

14 Claims, 11 Drawing Sheets

U.S. PATENT DOCUMENTS

| | | | |
|---|---|---|---|
| 4,894,662 A | 1/1990 | Counselman | 342/357 |
| 4,894,842 A | 1/1990 | Broekhoven et al. | 375/1 |
| 4,992,720 A | 2/1991 | Hata | 320/23 |
| 4,998,111 A | 3/1991 | Ma et al. | 342/352 |
| 5,007,068 A | 4/1991 | Simon et al. | |
| 5,014,066 A | 5/1991 | Counselman, III | 342/352 |
| 5,018,088 A | 5/1991 | Higbie | 364/574 |
| 5,036,329 A | 7/1991 | Ando | 342/357 |
| 5,043,736 A | 8/1991 | Darnell et al. | 342/357 |
| 5,108,334 A | 4/1992 | Eschenbach et al. | 455/314 |
| 5,148,042 A | 9/1992 | Nakazoe | 307/65 |
| 5,153,591 A | 10/1992 | Clark | 341/51 |
| 5,175,557 A | 12/1992 | King et al. | |
| 5,179,724 A | 1/1993 | Lindoff | 455/76 |
| 5,202,829 A | 4/1993 | Geier | 364/449 |
| 5,225,842 A | 7/1993 | Brown et al. | 342/357 |
| 5,253,268 A | 10/1993 | Omura et al. | 375/1 |
| 5,267,260 A * | 11/1993 | Lee | 370/342 |
| 5,276,765 A | 1/1994 | Freeman et al. | 395/2 |
| 5,293,170 A | 3/1994 | Lorenz et al. | 376/309 |
| 5,293,398 A | 3/1994 | Hamao et al. | 375/1 |
| 5,297,097 A | 3/1994 | Etoh et al. | 365/226 |
| 5,311,195 A | 5/1994 | Mathis et al. | 342/357 |
| 5,323,164 A | 6/1994 | Endo | 342/357 |
| 5,343,209 A | 8/1994 | Sennott et al. | 342/357 |
| 5,345,244 A | 9/1994 | Gildea et al. | 342/357 |
| 5,347,536 A | 9/1994 | Meehan | 375/1 |
| 5,352,970 A | 10/1994 | Armstrong, II | 320/39 |
| 5,363,030 A | 11/1994 | Ford et al. | 320/13 |
| 5,378,155 A | 1/1995 | Eldridge | 434/11 |
| 5,379,224 A | 1/1995 | Brown et al. | 364/449 |
| 5,396,515 A | 3/1995 | Dixon et al. | 375/208 |
| 5,402,346 A | 3/1995 | Lion et al. | 364/436 |
| 5,402,347 A | 3/1995 | McBurney et al. | 364/443 |
| 5,410,747 A | 4/1995 | Ohmagari et al. | 455/118 |
| 5,416,712 A | 5/1995 | Geier et al. | 364/450 |
| 5,418,818 A | 5/1995 | Marchetto et al. | 375/264 |
| 5,420,593 A | 5/1995 | Niles | 342/357 |
| 5,440,311 A | 8/1995 | Gallagher et al. | |
| 5,440,313 A | 8/1995 | Osterdock et al. | 342/352 |
| 5,450,344 A | 9/1995 | Woo et al. | 364/449 |
| 5,498,239 A | 3/1996 | Galel et al. | 604/95 |
| 5,504,684 A | 4/1996 | Lau et al. | 364/443 |
| 5,546,445 A | 8/1996 | Dennison et al. | 379/60 |
| 5,548,613 A | 8/1996 | Kaku et al. | 375/208 |
| 5,550,811 A | 8/1996 | Kaku et al. | 370/18 |
| 5,568,473 A | 10/1996 | Hemmati | 370/18 |
| 5,577,023 A | 11/1996 | Marum et al. | 370/16 |
| 5,577,025 A | 11/1996 | Skinner et al. | 370/22 |
| 5,586,148 A | 12/1996 | Furukawa et al. | |
| 5,592,173 A | 1/1997 | Lau et al. | 342/357 |
| 5,594,453 A | 1/1997 | Rodal et al. | 342/357 |
| 5,608,722 A | 3/1997 | Miller | 370/320 |
| 5,623,485 A | 4/1997 | Bi | 370/209 |
| 5,625,668 A | 4/1997 | Loomis et al. | 379/58 |
| 5,640,429 A | 6/1997 | Michaels et al. | 375/340 |
| 5,640,431 A | 6/1997 | Bruckert et al. | 375/344 |
| 5,642,377 A | 6/1997 | Chung et al. | 375/200 |
| 5,644,591 A | 7/1997 | Sutton | 375/200 |
| 5,649,000 A | 7/1997 | Lee et al. | 455/436 |
| 5,650,792 A | 7/1997 | Moore et al. | 343/725 |
| 5,654,718 A | 8/1997 | Beason et al. | 342/357 |
| 5,663,734 A | 9/1997 | Krasner | 342/357 |
| 5,663,735 A | 9/1997 | Eshenbach | 342/357 |
| 5,689,814 A | 11/1997 | Hagisawa et al. | 455/69 |
| 5,722,061 A | 2/1998 | Hutchison, IV et al. | 455/245.1 |
| 5,734,674 A | 3/1998 | Fenton et al. | 375/207 |
| 5,734,966 A | 3/1998 | Farrer et al. | 455/63 |
| 5,737,329 A | 4/1998 | Horiguchi | 370/342 |
| 5,739,596 A | 4/1998 | Takizawa et al. | 307/66 |
| 5,749,067 A | 5/1998 | Barrett | 704/233 |
| 5,781,156 A | 7/1998 | Krasner | 342/357 |
| 5,784,695 A | 7/1998 | Upton et al. | 455/442 |
| 5,786,789 A | 7/1998 | Janky | 342/357 |
| 5,812,087 A | 9/1998 | Krasner | 342/357 |
| 5,825,327 A | 10/1998 | Krasner | 342/357 |
| 5,828,694 A | 10/1998 | Schipper | 375/208 |
| 5,831,574 A | 11/1998 | Krasner | 342/357 |
| 5,832,021 A | 11/1998 | Kondo | 375/200 |
| 5,841,396 A | 11/1998 | Krasner | 342/357 |
| 5,845,203 A | 12/1998 | LaDue | 455/414 |
| 5,852,630 A | 12/1998 | Langberg et al. | |
| 5,854,605 A | 12/1998 | Gildea | 342/357 |
| 5,862,465 A | 1/1999 | Ou | 455/234.1 |
| 5,867,535 A | 2/1999 | Phillips et al. | 375/295 |
| 5,867,795 A | 2/1999 | Novis et al. | 455/566 |
| 5,872,540 A | 2/1999 | Casabona et al. | 342/362 |
| 5,874,914 A | 2/1999 | Krasner | 342/357 |
| 5,877,724 A | 3/1999 | Davis | 342/357 |
| 5,877,725 A | 3/1999 | Kalafus | 342/357 |
| 5,881,371 A | 3/1999 | Reynolds | 455/83 |
| 5,883,594 A | 3/1999 | Lau | 342/357 |
| 5,884,214 A | 3/1999 | Krasner | 701/207 |
| 5,889,474 A | 3/1999 | LaDue | 340/825.49 |
| 5,903,654 A | 5/1999 | Milton et al. | 380/49 |
| 5,907,809 A | 5/1999 | Molnar et al. | 455/456 |
| 5,909,640 A | 6/1999 | Farrer et al. | 455/63 |
| 5,917,444 A | 6/1999 | Loomis et al. | 342/357 |
| 5,917,829 A | 6/1999 | Hertz et al. | 370/479 |
| 5,920,283 A | 7/1999 | Shaheen et al. | 342/357 |
| 5,923,703 A | 7/1999 | Pon et al. | 375/209 |
| 5,924,024 A | 7/1999 | Ikeda et al. | 455/313 |
| 5,926,131 A | 7/1999 | Sakumoto et al. | 342/357 |
| 5,936,572 A | 8/1999 | Loomis et al. | 342/357 |
| 5,943,363 A | 8/1999 | Hanson et al. | 375/206 |
| 5,945,944 A | 8/1999 | Krasner | 342/357.06 |
| 5,956,328 A * | 9/1999 | Sato | 370/335 |
| 5,963,582 A | 10/1999 | Stansell, Jr. | 375/200 |
| 5,970,084 A | 10/1999 | Honda | 375/200 |
| 5,977,909 A | 11/1999 | Harrison et al. | 342/357.09 |
| 5,982,324 A | 11/1999 | Watters et al. | 342/357.06 |
| 5,987,016 A | 11/1999 | He | 370/335 |
| 5,991,309 A | 11/1999 | Jensen et al. | 370/492 |
| 5,991,613 A | 11/1999 | Euscher et al. | 455/277.1 |
| 5,995,537 A | 11/1999 | Kondo | 375/208 |
| 5,999,124 A | 12/1999 | Sheynblat | 342/357.09 |
| 6,002,362 A | 12/1999 | Gudat | 342/357.03 |
| 6,002,363 A | 12/1999 | Krasner | 342/357.1 |
| 6,002,709 A | 12/1999 | Hendrickson | 375/206 |
| 6,005,885 A | 12/1999 | Warren et al. | |
| 6,005,903 A | 12/1999 | Mendelovicz | |
| 6,009,551 A | 12/1999 | Sheynblat | 714/776 |
| 6,016,119 A | 1/2000 | Krasner | 342/357.06 |
| 6,023,462 A | 2/2000 | Nieczyporowicz et al. | 370/335 |
| 6,041,222 A | 3/2000 | Horton et al. | 455/255 |
| 6,044,105 A | 3/2000 | Gronemeyer | |
| 6,047,016 A | 4/2000 | Ramberg et al. | 375/200 |
| 6,047,017 A | 4/2000 | Cahn et al. | 375/200 |
| 6,049,715 A | 4/2000 | Willhoff et al. | 455/436 |
| 6,052,081 A | 4/2000 | Krasner | 342/357.02 |
| 6,061,018 A | 5/2000 | Sheynblat | 342/357.06 |
| 6,064,336 A | 5/2000 | Krasner | 342/357.05 |
| 6,064,688 A | 5/2000 | Yanagi | 375/149 |
| 6,075,809 A | 6/2000 | Naruse | 375/147 |
| 6,104,338 A | 8/2000 | Krasner | 342/357.06 |
| 6,104,340 A | 8/2000 | Krasner | 342/357.1 |
| 6,107,960 A | 8/2000 | Krasner | 342/357.09 |
| 6,111,540 A | 8/2000 | Krasner | 342/357.1 |
| 6,130,906 A * | 10/2000 | Davidovici et al. | 375/152 |
| 6,131,067 A | 10/2000 | Girerd et al. | 701/213 |
| 6,133,871 A | 10/2000 | Krasner | 342/357.06 |
| 6,133,873 A | 10/2000 | Krasner | 342/357.12 |
| 6,133,874 A | 10/2000 | Krasner | 342/357.15 |
| 6,150,980 A | 11/2000 | Krasner | 342/357.1 |

| | | |
|---|---|---|
| 6,151,353 A | 11/2000 | Harrison et al. |
| 6,185,427 B1 | 2/2001 | Krasner |
| 6,198,765 B1 | 3/2001 | Cahn et al. |
| 6,208,290 B1 | 3/2001 | Krasner |
| 6,208,291 B1 | 3/2001 | Krasner |
| 6,215,441 B1 | 4/2001 | Moeglein |
| 6,215,442 B1 | 4/2001 | Sheynblat |
| 6,225,943 B1 | 5/2001 | Curley et al. |
| 6,236,354 B1 | 5/2001 | Krasner |
| 6,239,742 B1 | 5/2001 | Krasner |
| 6,259,399 B1 | 7/2001 | Krasner |
| 6,272,430 B1 | 8/2001 | Krasner |
| 6,289,041 B1 | 9/2001 | Krasner |
| 6,307,504 B1 | 10/2001 | Sheynblat |
| 6,313,786 B1 | 11/2001 | Sheynblat |
| 6,314,308 B1 | 11/2001 | Sheynblat |
| 6,356,602 B1 | 3/2002 | Rodal et al. |
| 6,377,209 B1 | 4/2002 | Krasner |
| 6,377,613 B1 * | 4/2002 | Kawabe et al. ............... 375/142 |
| 6,408,196 B2 | 6/2002 | Sheynblat |
| 6,411,254 B1 | 6/2002 | Moeglein |
| 6,411,892 B1 | 6/2002 | Van Diggelen |
| 6,417,801 B1 | 7/2002 | Van Diggelen |
| 6,421,002 B2 | 7/2002 | Krasner |
| 6,429,814 B1 | 8/2002 | Van Diggelen et al. |
| 6,433,731 B1 | 8/2002 | Sheynblat |
| 6,453,237 B1 | 9/2002 | Fuchs et al. |
| 6,484,097 B2 | 11/2002 | Fuchs et al. |
| 6,487,499 B1 | 11/2002 | Fuchs et al. |
| 6,510,387 B2 | 1/2003 | Fuchs et al. |
| 6,542,821 B2 | 4/2003 | Krasner |
| 6,583,757 B2 | 6/2003 | Krasner |
| 6,597,311 B2 | 7/2003 | Sheynblat |
| 6,714,983 B1 | 3/2004 | Koenck et al. |

FOREIGN PATENT DOCUMENTS

| | | |
|---|---|---|
| EP | 0639901 A3 | 2/1995 |
| JP | 08/065205 A | 3/1996 |
| WO | WO 92/13392 | 8/1992 |
| WO | WO 97/14053 | 4/1997 |
| WO | WO 00/19644 | 4/2000 |

OTHER PUBLICATIONS

Holm, Eric D. and Westerfield, Edwin E., "A GPS Fast Acquisition Receiver," vol. 14, pp. 214-218, The John Hopkins University Applied Physics Laboratory: National Telesystems Conference, New York, I.E.E.E., U.S., Nov. 14, 1983.

Levanon, N., and Getz, B., "Comparison between linear FM and phase-coded CW radars" *IEE, Proc.-Radar, Sonar Navig.*, Institution of Electrical Engineers, vol. 141, No. 4, pp. 230-240, Aug. 1, 1994.

Marketing Material: Qualcomm CDMA Technologies — Integrated Solutions — MGP6200™ Multimode GPS Processor (8 pages).

Marketing Material: uNav Microelectronics — uN9x18 Low Power, High Performance GPS Receiver Chipset/uN9x18 GPS Receiver Solution (9 pages).

Marketing Material: uNav Microelectronics, uN9x18 Low Power, High Performance GPS Receiver Chipset (2 pages).

Marketing Material: Global Locate -- Hammerhead II™, Single Chip AGPS Solution (2 pages).

Marketing Material/Press Release: Broadcom Introduces Advanced Single-Chip GPS Solution for Mobile Applications (3 pages).

Marketing Material/White Paper: SnapTrack: A Qualcomm Company — SnapTrack's Wireless Assisted GPS™ (A-GPS) Solution Provides the Industry's Best Location System — Location Technologies for GSM, GPRS and WCDMA Networks (Qualcomm CDMA Technologies: Enabling the Future of Communications) (4 pages).

Three Book Series by Marvin K. Simon, Jim K. Omura, Robert A. Scholtz, and Barry K. Levitt, Spread Spectrum Communications, vol. I, II and III, Rockville Md.: Computer Science Press, 1985.

Robert A. Scholtz, The Origins of Spread-Spectrum Communications, IEEE Transactions on Communications; COM-30, pp. 822-854, May 1982.

Robert A. Scholtz, Notes on Spread-Spectrum History, IEEE Transactions on Communications, COM-31, pp. 82-84, Jan. 1983.

Robert Price, Further Notes and Anecdotes on Spread Spectrum Origins, IEEE Transactions on Communications, COM-31, pp. 85-97, Jan. 1983.

* cited by examiner

| Row | C | Switches | $A_n$ in FIG. 8 | $A_n$ in FIG. 9 | Sum of Rows |
|---|---|---|---|---|---|
| 1 | $C_n$ | EQ | $C_nQ_{2n} + C_nQ_{2n+1} + C_{n+1}Q_{2n+2} + C_{n+1}Q_{2n+3}$ | $C_nQ_{2n} + C_{n+1}Q_{2n+2}$ | 1 + 3 |
| 2 | $C_n$ | EI | $C_nI_{2n} + C_nI_{2n+1} + C_{n+1}I_{2n+2} + C_{n+1}I_{2n+3}$ | $C_nI_{2n} + C_{n+1}I_{2n+2}$ | 2 + 4 |
| 3 | $C_n$ | OQ | $C_nQ_{2n} + C_{n+1}Q_{2n+1} + C_{n+1}Q_{2n+2} + C_{n+2}Q_{2n+3}$ | $C_nQ_{2n+1} + C_{n+1}Q_{2n+3}$ | 1 + 7 |
| 4 | $C_n$ | OI | $C_nI_{2n} + C_{n+1}I_{2n+1} + C_{n+1}I_{2n+2} + C_{n+2}I_{2n+3}$ | $C_nI_{2n+1} + C_{n+1}I_{2n+3}$ | 2 + 8 |
| 5 | $C_{n+1}$ | EQ | $C_{n+1}Q_{2n} + C_{n+1}Q_{2n+1} + C_{n+2}Q_{2n+2} + C_{n+2}Q_{2n+3}$ | $C_{n+1}Q_{2n} + C_{n+2}Q_{2n+2}$ | 5 + 7 |
| 6 | $C_{n+1}$ | EI | $C_{n+1}I_{2n} + C_{n+1}I_{2n+1} + C_{n+2}I_{2n+2} + C_{n+2}I_{2n+3}$ | $C_{n+1}I_{2n} + C_{n+2}I_{2n+2}$ | 6 + 8 |
| 7 | $C_{n+1}$ | OQ | $C_{n+1}Q_{2n} + C_{n+2}Q_{2n+1} + C_{n+2}Q_{2n+2} + C_{n+3}Q_{2n+3}$ | $C_{n+1}Q_{2n+1} + C_{n+2}Q_{2n+3}$ | 5 + 11 |
| 8 | $C_{n+1}$ | OI | $C_{n+1}I_{2n} + C_{n+2}I_{2n+1} + C_{n+2}I_{2n+2} + C_{n+3}I_{2n+3}$ | $C_{n+1}I_{2n+1} + C_{n+2}I_{2n+3}$ | 6 + 12 |
| 9 | $C_{n+2}$ | EQ | $C_{n+2}Q_{2n} + C_{n+2}Q_{2n+1} + C_{n+3}Q_{2n+2} + C_{n+3}Q_{2n+3}$ | $C_{n+2}Q_{2n} + C_{n+3}Q_{2n+2}$ | |
| 10 | $C_{n+2}$ | EI | $C_{n+2}I_{2n} + C_{n+2}I_{2n+1} + C_{n+3}I_{2n+2} + C_{n+3}I_{2n+3}$ | $C_{n+2}I_{2n} + C_{n+3}I_{2n+2}$ | |
| 11 | $C_{n+2}$ | OQ | $C_{n+2}Q_{2n} + C_{n+3}Q_{2n+1} + C_{n+3}Q_{2n+2} + C_{n+4}Q_{2n+3}$ | $C_{n+2}Q_{2n+1} + C_{n+3}Q_{2n+3}$ | |
| 12 | $C_{n+2}$ | OI | $C_{n+2}I_{2n} + C_{n+3}I_{2n+1} + C_{n+3}I_{2n+2} + C_{n+4}I_{2n+3}$ | $C_{n+2}I_{2n+1} + C_{n+3}I_{2n+3}$ | |

FIG. 10

SYSTEM AND METHOD FOR DESPREADING IN A SPREAD SPECTRUM MATCHED FILTER

CROSS-REFERENCE TO RELATED APPLICATIONS

This application is a continuation in part of Non-Provisional patent application Ser. No. 09/498,893, filed on Feb. 7, 2000, and entitled IMPROVED DOPPLER CORRECTED SPREAD SPECTRUM MATCHED FILTER, which is a continuation in part of Non-Provisional patent application Ser. No. 09/145,055, filed on Sep. 1, 1998, and entitled DOPPLER CORRECTED SPREAD SPECTRUM MATCHED FILTER, now U.S. Pat. No. 6,044,105, both of which are incorporated by reference.

TECHNICAL FIELD

This invention relates to electronic communication systems. In particular, the invention relates to an improved system and method for despreading a PN code from a spread spectrum signal in a matched filter.

BACKGROUND OF THE INVENTION

Conventionally, data communication systems use narrow band modulation techniques, such as amplitude modulation "AM," frequency modulation "FM," frequency shift keying "FSK," binary phase shift keying "BPSK," quadrature phase shift keying "QPSK," and quadrature amplitude modulation "QAM." With such systems, demodulation at the receiver may be achieved with a relatively small amount of circuitry. However, these types of systems suffer from several problems including multipath fading and narrow band noise.

In contrast, in spread spectrum communication systems, a data spectrum is spread by a pseudo-noise "PN" code at a transmitter while the PN code and the data are synchronized at a receiver. The PN code is composed of a binary sequence that is often referred to as the "chip sequence." The binary symbols iii the chip sequence are referred to as "chips" and it is appreciated by those skilled in the art that the transmitter and intended receiver both have available the same chip sequence. This technique reduces the adverse effects of multipath fading and narrow band noise. The military has employed spread spectrum communication systems to combat the intentional jamming and detection of radio and satellite communication links. Accordingly, spread spectrum communication systems have attracted increased attention as a promising technique for radio frequency transmission of binary data in the non-military sector.

One of the two most common spread spectrum techniques, referred to as frequency hopping spread spectrum "FH-DSS," employs the chip sequence to shift, over a wide bandwidth, the carrier frequency of a conventional narrow band transmitter signal. The other common technique, referred to as direct sequence spread spectrum "DS-DSS," directly multiplies a conventional narrow band signal by the chip sequence. The chip rate is typically much higher than the data rate of the conventional narrow band signal. In both of these common spread spectrum techniques, a conventional narrow band signal is viewed as a carrier that is either frequency modulated or directly multiplied by the chip sequence. It is appreciated that other types of spread spectrum systems include combinations of both FH-DSS and DS-DSS in one system.

Spread spectrum signals allow more than one transmission signal in the same frequency and time interval when each signal uses a different chip sequence. This technique is known as code division multiple access "CDMA." An example application of Direct Sequence CDMA "DS-CDMA" is the Global Positioning System "GPS." The GPS system uses DS-CDMA to broadcast time and position data to receivers, which use such data to determine position and navigation information.

In a spread spectrum system, the conventional narrow band signal is spread by a PN code signal that has a wider bandwidth than the conventional narrow band signal. In order to correctly restore the conventional narrow band signal, the demodulation PN code generated at the receiving side is synchronized to the modulation PN code generated at the transmitting side. Proper phase synchronization is typically achieved when the received spread spectrum signal is accurately timed in both its spreading PN code pattern position and its rate of chip generation. The phase synchronization process is preferably accomplished in two stages: an initial synchronization process to find a synchronous phase, and a process to track the detected phase. Known techniques for initial synchronization depend upon both analog and digital sliding correlators, matched filters and other equivalent devices.

In a conventional matched filter spread spectrum receiver, the receiver includes a radio frequency "RF" section that receives the spread spectrum signal having a PN code modulated therein. The receiver converts the received spread spectrum signal into an intermediate-frequency "RF" signal. An in-phase converter and a quadrature-phase converter convert the IF signal into an in-phase "I-channel" spread signal and a quadrature-phase "Q-channel" spread signal. A PN code sync device de-spreads the received PN code modulated from the spread spectrum signal by synchronizing a reference PN code with the received PN code and maintaining the two codes in fine synchronism using, for example, a pair of correlators or a tracking loop based on a matched filter. A data demodulator demodulates the spread spectrum signal into the original baseband "narrow band" signal. Utilizing a matched filter has the advantage that the transmitted spread spectrum signal may be acquired relatively quickly even with relatively large initial errors between the locally generated PN code and the received PN code.

Unfortunately, a problem associated with matched filters is that matched filters include register and summing circuits to despread a PN code from a spread spectrum signal. Conventional register and summing circuits use a significant number of multipliers and adders to perform the calculations necessary to despread the PN code. This increases the amount of power used by the circuit and slows down the calculations. Accordingly, there is a need for a register and summing circuit that avoids the limitations of the prior art, has low power consumption, and is fast.

SUMMARY

A number of technical advances are achieved in the art, by implementation of an improved matched filter system for despreading a spread spectrum signal using a PN code. The improved matched filter system may be broadly conceptualized as a system that optimizes the number of multipliers and adders utilized by the system in despreading a spread spectrum signal using a PN code; thus lowering the power consumption of the improved matched filter system and increasing the speed at which the system despreads the spread spectrum signal using a PN code.

For example, an improved matched filter system that receives a spread spectrum signal may utilize a system architecture that recognizes that the same calculations are performed for the in-phase portion and the quadrature-phase portion of each signal sample of the spread spectrum signal, as well as for alternating pairs of signal samples. An implementation of the system architecture may include a switch and a multiplier in signal communication with the switch. The switch selects either the in-phase portion or the quadrature-phase portion of the spread spectrum signal, and the multiplier multiplies the selected portion of one of the signal sample with one of the PN code chips to obtain a product. The implementation may further include another multiplier coupled to the switch and an adder coupled to the first multiplier and the second multiplier. The second multiplier multiplies the selected portion of a second signal sample (which succeeds the first signal sample) with the PN code chip to obtain a second product. The adder then adds the first product with the second product to obtain a sum.

The improved matched filter system may also utilize a system architecture that recognizes that the same calculations are performed for pairs of signal samples. However, the spread spectrum signal comprises a plurality of signal sample pairs. Each pair of signal samples includes an even signal sample and an odd signal sample, and each signal sample has an in-phase portion and a quadrature-phase portion. An implementation of the system architecture may include a number of switches and multipliers. In its simplest form, the implementation may include two switches and a multiplier. The first switch is coupled to the second switch and the multiplier is coupled to the second switch. The first switch selects either the in-phase portion or the quadrature-phase portion of the spread spectrum signal. The second switch selects either the even sample or the odd sample. The multiplier multiplies the selected portion of the selected sample of one signal sample pair with one PN code chip to obtain a product.

The system may also include a second multiplier coupled to the second switch and an adder coupled to the first multiplier and the second multiplier. The second multiplier multiplies the selected portion of the selected sample of a second signal sample pair (which succeeds the first signal sample pair) with a second PN code chip (which succeeds the first PN code chip) to obtain a second product. The adder then adds the first product with the second product to obtain a sum.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention can be better understood with reference to the following figures. The components in the figures are not necessarily to scale, emphasis instead being placed upon illustrating the principals of the invention. Moreover, in the figures, like reference numerals designate corresponding parts throughout the different views.

FIG. 10 is a table comparing the calculations performed by the register and summing circuitry of FIG. 8 and the register and summing circuitry of FIG. 9.

Figure 1:
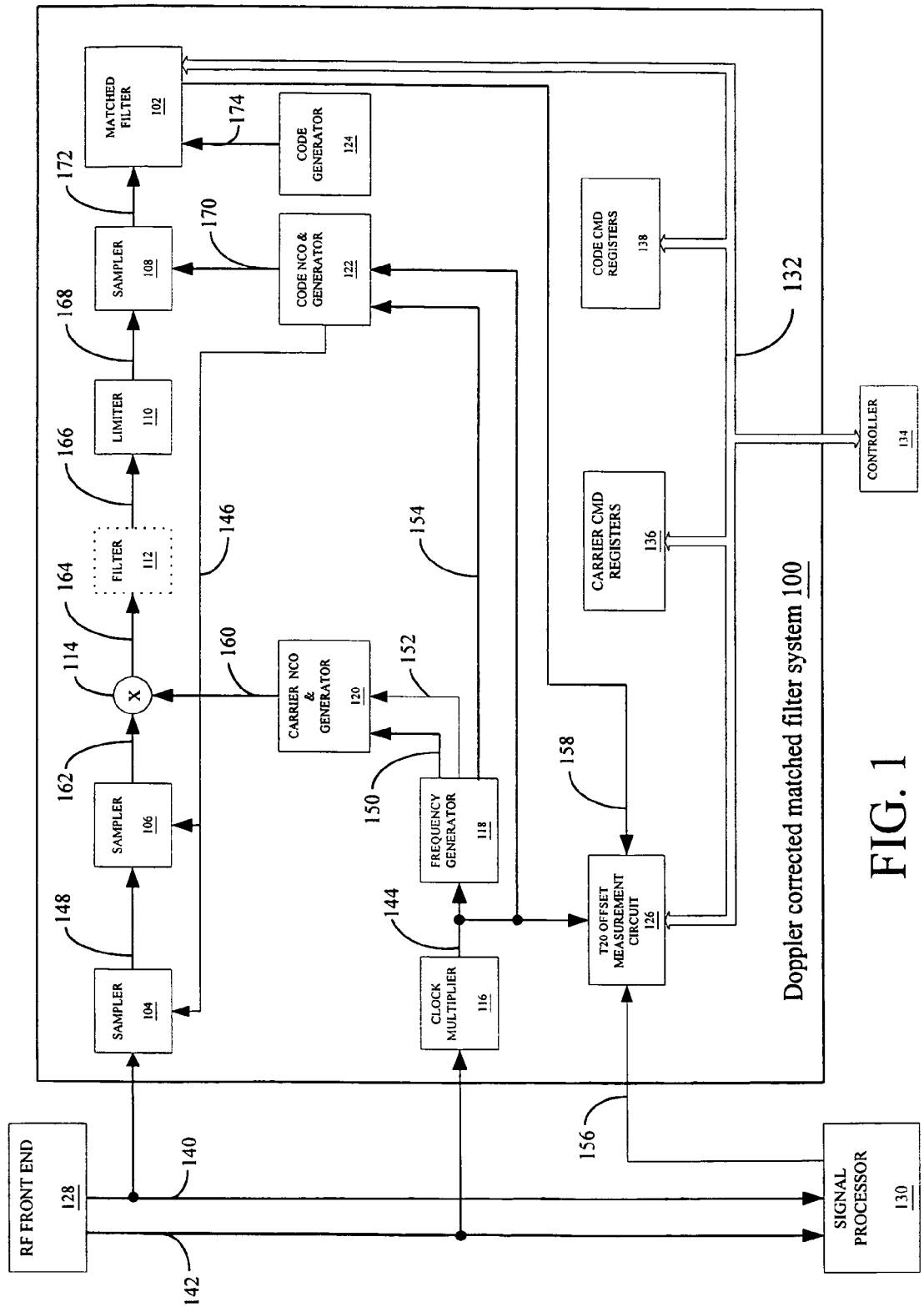
FIG. 1 is a block diagram of an example implementation of a system utilizing a Doppler corrected matched filter in accordance with the invention.

Reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications, and equivalents included within the spirit and scope of the invention as defined by the appended claims.

DETAILED DESCRIPTION OF THE PREFERRED EMBODIMENTS

The invention is described for use with a spread spectrum matched filter with Doppler correction suitable for use in L radio frequency receiver. The Doppler corrected matched filter may serve a number of applications including use in spread spectrum or Global Positioning System "GPS" radio frequency receivers. In a normal GPS navigation application, the Doppler corrected matched filter system may selectively output code phase information that allows a signal processing tracking loop to directly acquire prepositioning data for a particular GPS satellite. The Doppler corrected matched filter system is then utilized in support of reacquisition and anti-multipath operations. Additionally, in a single fix application, the Doppler corrected matched filter system may provide the only data required because the signal processing channels are not employed.

1. System Architecture

Referring now in detail to the drawings in which the reference numerals indicate like parts throughout several views, FIG. 1 is a block diagram showing an example implementation of a Doppler corrected matched filter system 100 utilizing a matched filter 102 in accordance with the invention. The Doppler corrected matched filter system 100 includes three sets of samplers 104, 106 and 108 (i.e., the samplers may selectively be latches), respectively, a limiter 110, an optional filter 112, the matched filter 102, and a mixer 114. The Doppler corrected matched filter system 100 also includes clock multiplier 116, frequency generator 118, carrier numerically controlled oscillator "NCO" and generator 120, a code NCO and generator 122, a code generator 124, and a T20 offset measurement circuit 126.

The Doppler corrected matched filter system 100 may be utilized in various contexts, such as in communications or navigation applications. The Doppler corrected matched filter system 100 is in signal communication with a conventional spread spectrum radio frequency "RF" receiver front end 128 and a signal processor 130. The Doppler corrected matched filter system 100 has an interface to an external bus 132 over which the Doppler corrected matched filter system 100 may receive commands from a controller 134 (for example, in a carrier command register set 136 and/or a code command register set 138) and provide output results to the controller 134. The external bus 132 is in signal communication with a controller 134. The Doppler corrected matched filter system 100 may be integrated into a receiver system, or may constitute a separate device.

The controller 134 may selectively be any general-purpose processor such as an Intel XXX86, Motorola 68XXX or PowerPC, or other equivalent processor capable of running software instructions (not shown) resident on the controller 134. Alternatively, a GPS-specific circuit or oriented device may selectively also be utilized. It is appreciated that the controller 134 may also be integrated into a signal semiconductor chip such as an Application Specific Integrated Chip "ASIC" or Reduced Instruction Set Computer "RISC," or may be implemented via a Digital Signal Processor (DSP) chip. Examples of OPS-oriented devices Include the "Scorpio 11577-11" digital integrated circuit produced by Conexant Systems, Tnc., "GSP1 SiRFstar I" and "GSP2e SiRFstart II" architectures available from SiRF Technology, Inc., "MGP-SCS-A1" and "MMC2003" from Motorola, Inc., and the "SAA1575HL" GPS baseband processor from Philips, Inc, or the equivalent.

The RF receiver front end 128 converts a received spread spectrum signal into an intermediate-frequency "IF" signal and then converts the IF signal into an in-phase I signal and a quadrature-phase Q signal 140 which correspond to the real and imaginary parts of the received signal. For example purposes, the I and Q signals are each represented as 2-bit binary values in the range of −1, 0, and +1. It is appreciated that the −1 value is preferably represented as the 2's complement of the value 1. Thus, the 2-bit binary values would be 00, 01, and 11. The RF receiver front end 128 also provides a clock signal 142 to the Doppler corrected matched filter system 100 via the clock multiplier 116. In a GPS DS-CDMA system, the fundamental frequency $F_0$ is 10.23 MHz. This fundamental frequency is converted by the RF front end 128 to the clock signal 142 having a frequency $$f = F_0 \frac{137}{128}$$

(approximately 11 MHz). The frequency $$f = F_0 \frac{137}{128}$$

is then coupled to the clock multiplier 116. The signal processor 130 also receives the I and Q signals 140 and clock signal 142 from the RF receiver front end 128, and may have control signals in signal communication with the RF receiver front end 128, in known fashion.

Examples of the RF front end 128 may selectively be a "Gemini/Pisces Monopack R6732-13" integrated circuit available from Conexant Systems, Inc., "GRF1 SiRFstarI" and "GRF2i SiRFstarIIe" architectures available from SiRF Technology, Inc., "MGPSCS-A1" GPS Chipset, "PSRF111A" RF module, and/or "MRFIC1502" Integrated GPS down converter from Motorola, Inc., and/or the "UAA1570HL" GPS front-end receiver circuit from Philips, Inc, or the equivalent. The signal processor 130 may be, for example, the "Scorpio 11577-11" digital integrated circuit produced by Conexant Systems, Inc., "GSP1 SiRFstar I" and "GSP2e SiRFstart II" architectures available from SiRF Technology, Inc., "MGPSCS-A1" and "MMC2003" from Motorola, Inc., and the "SAA1575HL" GPS baseband processor from Philips, Inc, or the equivalent.

In an example implementation of the Doppler corrected matched filter system 100, input processing receives an input sample stream of data, reduces the sampling rate of the data, and stores 20 milliseconds (ms) worth of the resulting data samples. In this example, the Doppler corrected matched filter system 100 reduces the data sampling rate to about 2.046 MHz and stores complex data samples, each represented by a three level I sample (i.e., I=−1+j0, 0+j0 and 1+j0) and a three level Q sample (i.e., I=0−j, 0+j0 and 0+j). As a part of the sample rate reduction the received samples go through a complex mixing process to remove the $$f = F_0 \frac{1}{8}$$

(approximately 1.28 MHz), IF frequency, plus any desired offset frequency due to an estimated error in the frequency standard or to average Doppler shift. The 20 ms period during which the samples are taken is related to a T20 by means of an offset counter (not shown). It is appreciated that this relationship allows the correlation values output by the Doppler corrected matched filter system 100 to be related in time to the code phase settings of the various signal processing channels in a signal processor such as signal processor 130. In particular, the Doppler corrected matched filter system 100 utilizes the stored samples multiple times to calculate the cross correlation values between the received samples and several combinations of PN codes and Doppler shifts. The results of these operations are then supplied to the controller 134 (which may be part of the signal processor 130) via the external bus 132.

More particularly, in the Doppler corrected matched filter system 100, the clock multiplier 116 generates a $$f = F_0 \frac{137}{32}$$

(approximately 44 MHz) clock signal 144 from the input 11 MHz clock signal 142. The 44 MHz clock signal 144 is applied to the code NCO 122. The code NCO 122 generates a code clock 146 to re-sample the I and Q signals 140 in sampler 104. The code clock 146 sample frequency has a nominal rate of f=2$F_0$ (approximately 20.46 MHz) that is modified by commands from the controller 134 via code command register 138 to account for estimated values of average Doppler and IF error. The re-sampled data is then applied to the second sampler 106 via signal path 148. The second sampler 106 is also clocked by code clock 146.

The 44 MHz clock signal 144 is also applied to the frequency generator 118 which generates output signals of frequencies of f=2$F_0$ (approximately 20.46 MHz) 150;

$$f = F_0 \frac{1}{8}$$

(approximately 1.28 MHz) 152; and clock 154 at $$f = F_0 \frac{1}{30}$$

(approximately 341 kHz). The clocks 152 and 154 preferably have selectable rates of $$f = F_0 \frac{1}{2}$$

(approximately 5.115 MHz) and $$f = F_0 \frac{1}{60}$$

(approximately 171 kHz). These selectable rates accommodate a wider range of NCO frequencies which address systems with possibly less accurate fundamental frequency sources.

The signal processor 130 provides a T20 sync input 156 that may be synchronized to a data capture start signal 158 of the matched filter 102. When the controller 134 commands the matched filter 102 to capture data samples, the matched filter 102 provides a data capture start signal 150 to the T20 offset measurement circuit 126. The T20 offset measurement circuit 126 counts the 44 MHz clock cycles 144 until there is a transition in the T20 sync input 156. After the data capture is complete, the controller 134 reads the offset counter value from the T20 offset measurement circuit 126 via the external bus 132. The offset measurement allows the controller 134 to use the subsequent matched filter 102 code correlation outputs to initialize tracking loops in the signal processor 130.

The received samples in the second sampler 106 are re-sampled at $f=2F_0$ (approximately 20.46 MHz), via clock signal 146, from the code NCO and generator 122 in a manner similar to a normal DS-CDMA signal processing channel. The mixer 114 performs a complex multiplication of the output signal 160 of the carrier frequency NCO and generator 122 and the output signal 165 of the second sampler 106. The carrier frequency NCO and generator 122 produces the output signal 160 at the TF frequency, $$f = F_0 \frac{1}{8}$$

(approximately 1.28 MHz), plus an estimated frequency and average Doppler error. The mixer 114 preferably utilizes the a 7 level (i.e., −3 to 3 and −3j to 3j for I and Q) mixing scheme (similar to a conventional signal processing channel), resulting in an output range for each of the I and Q signals of −6 to +6 and −6j to +6j [i.e., (1+j)(3−3j)=6, (−1−j)(3−3j)=−6, (1+j)(3+3j)=6j, (1−j)(3−3j)=−6j, etc.], represented in 8 bits (i.e., 4 bits real and 4 bits imaginary). The output signal 164 of the mixer 114 stage may then be applied to the optional anti-aliasing filter 112 to limit the bandwidth of the output signal 164 to no more than twice the sampling rate of the third sampler 108 downstream from the filter 112. The filter 112 preferably provides a sliding average of 20 of the input samples to the filter 112.

The processed signal 166, from the either the optional filter 112 or the mixer 114 (same as output 164 if from mixer 114), is then applied to the limiter 110 which limits the range of binary values to −1, 0, and +1, represented in 2 bits each for the I and Q signals, to reduce the amount of data stored for 20 ms of the signal samples. The limited, mixed signal 168 is then re-sampled through the third sampler 108 at a frequency, $$f = F_0 \frac{1}{5},$$

(approximately 2.046 MHz) with a signal 170 from the code frequency NCO and generator 122 to reduce the amount of data stored for the 20 ms of signal samples. The output 172 of the third sampler 108 is input into the matched filter 102. A separate code generator 124 provides a desired PN code 174 "chip sequence" to the matched filter 102 (described in further detail below). It is appreciated that the provision of both a carrier NCO/mixer and a code NCO/sampler allows independent correction for a pure frequency shift in the former and of a Doppler shift to both carrier and code in the latter.

Figure 2:
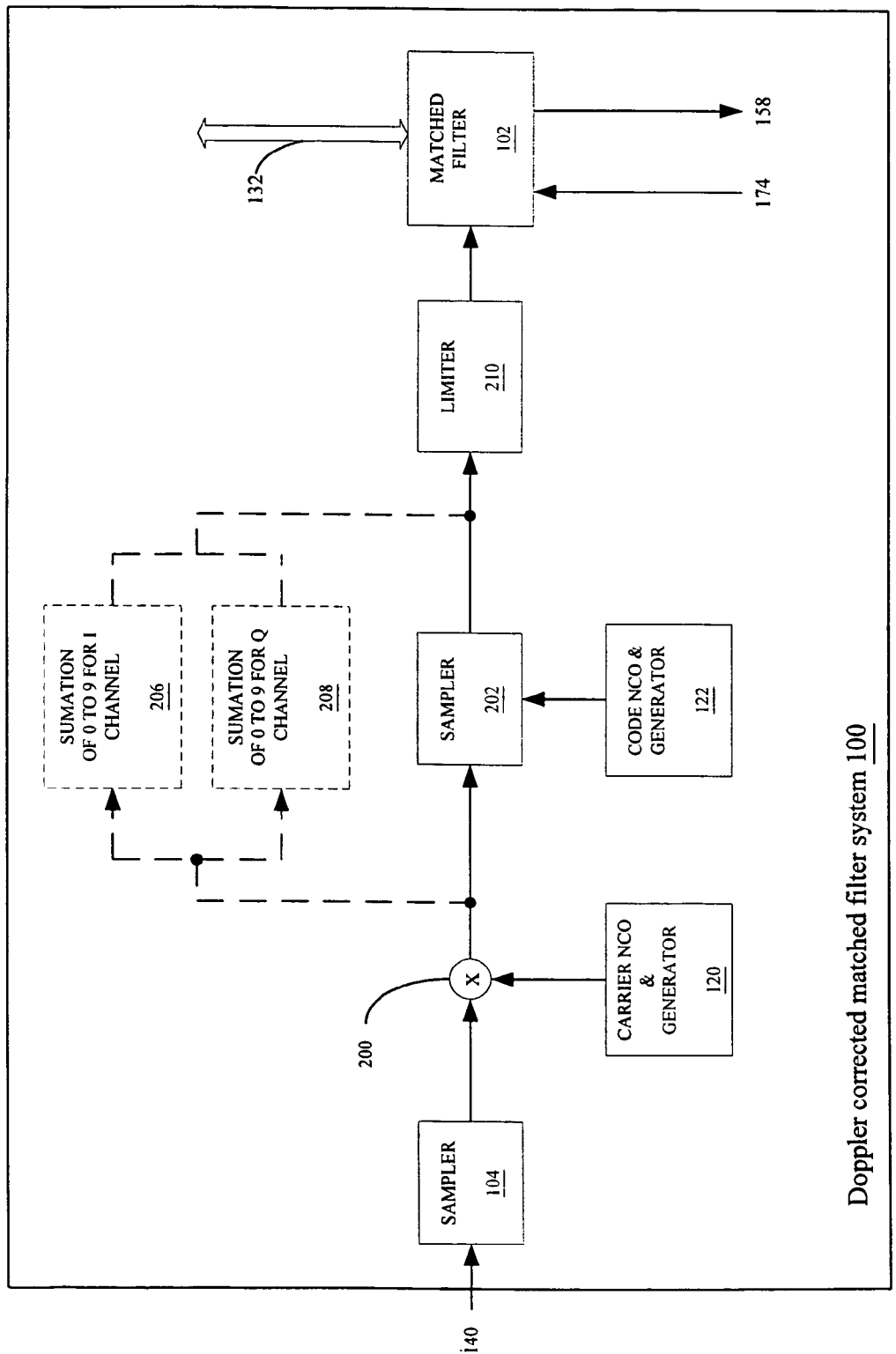
FIG. 2 is a block diagram of an another example of system utilizing a Doppler corrected matched filter.

FIG. 2 is a block diagram of another example implementation of a Doppler corrected matched filter system 100. In this example, the incoming I and Q signals 140 (from the RF front end 128 in FIG. 1) are re-sampled through the first sampler 104 at $F_0$ and then subjected to 5 level (i.e., −2 to 2 and −2j to 2j for I and Q) mixing by mixer 200. Limiting is shown occurring after the second sampler 202 at limiter 204. An alternative approach is shown in dotted outline. In this alternative approach, a filtering operation (through two summing registers 206 for the I channel and 208 for the Q channel) reduces the sample rate by a factor of ten, rather than re-sampling by means of the second sampler 202. It is appreciated that the net effect of the filtering is to reduce the sample rate and correspondingly the size of a sample storage device, while avoiding the loss due to sample rate reduction without the appropriate bandwidth limiting beforehand. This implementation may be preferable when code phase measurements at the output of the matched filter 102 are to be interpolated for improved resolution.

2. Matched Filter Processing

Figure 3:
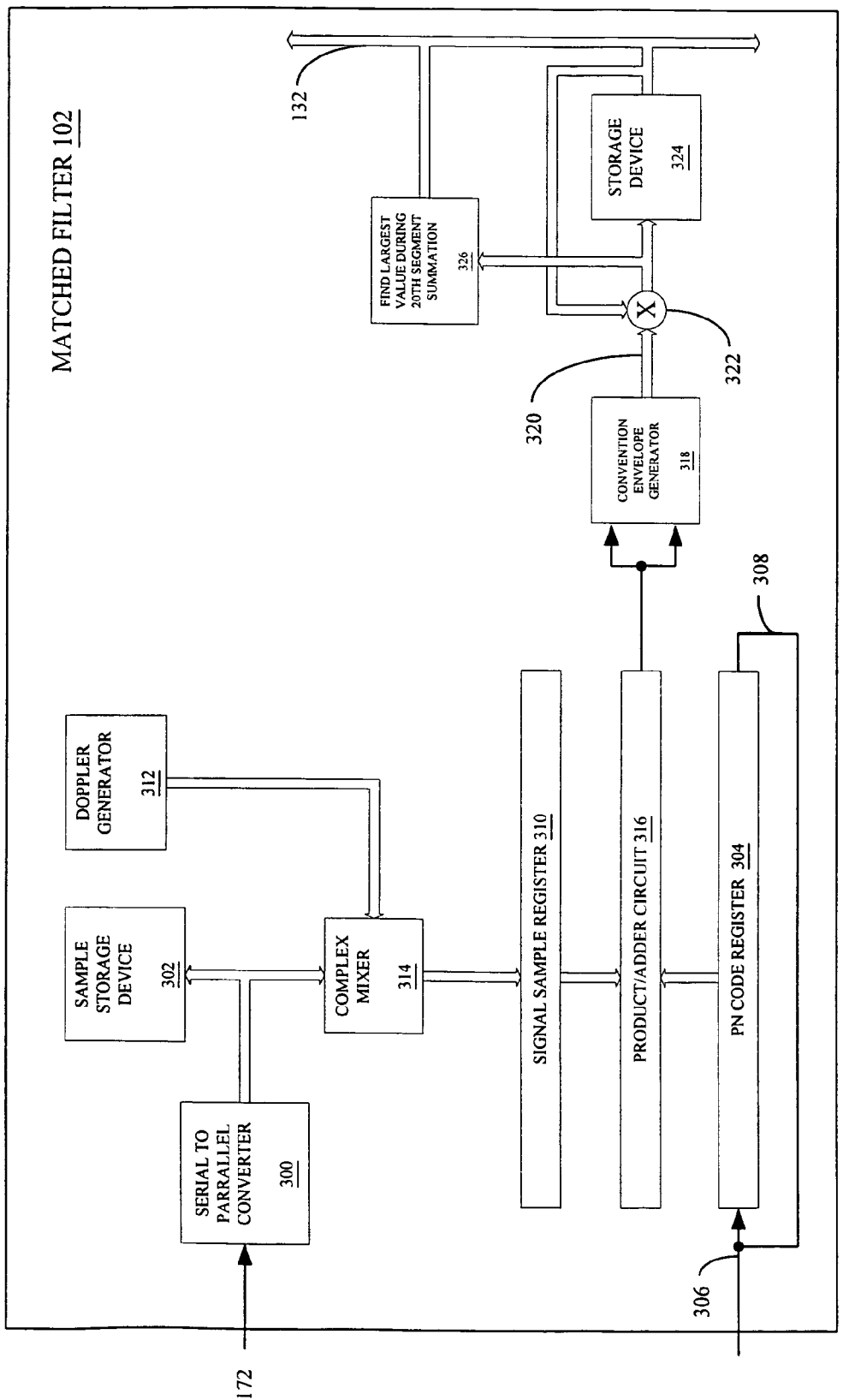
FIG. 3 is a block diagram of an example implementation of a matched filter shown in FIGS. 1 and 2.

Once the received samples are re-sampled and limited, they are stored in the matched filter 102 for repeated processing. FIG. 3 is an example block diagram of the matched filter 102 in accordance with the invention. In this example implementation, the sample signals 172, FIG. 1, are converted by a serial to parallel converter 300, FIG. 3, and stored in a sample storage device 302. The sample storage device 302 may selectively be a 16-bit wide random access memory "RAM" device. With 4-bit complex (i.e., 4-bit for the real I channel and 4-bit for the imaginary Q channel) input samples, the data may selectively be stored as 4 samples for each 16-bit word.

It is appreciated that the 20 ms of data samples are stored in the sample storage device 302. However, the data is processed in 1 ms segments, corresponding to the period of a GPS PN code. Each one millisecond period will have 2046 4-bit complex (i.e., 1023 4-bit real I channel and 1023 4-bit imaginary Q channel) signal samples and 1023 PN code chips, or 2 received samples per PN code chip. The PN chips may selectively be loaded serially into a PN code register 304 via signal pith 306 (that may selectively be 174 from FIG. 1) and the PN code is shifted through the PN code register 304 for each code phase via shift path 308. As each one millisecond segment from the sample storage device 302 is about to be processed, it is pre-multiplied by a Doppler shifting circuit (not shown) and then stored in a signal sample register 310. The Doppler shifting circuit comprises a Doppler generator 312 and a complex mixer 314.

The complex mixing operation is similar to the mixing shown in FIG. 1. In FIG. 1, the mixing shifts the code spectrum to near zero frequency offset. In FIG. 3, however, the mixing shifts the spectrum by a relatively small amount, roughly over a range of about 8000 Hz. It is appreciated that there are no more than about 8 cycles of complex local oscillator error in a one millisecond segment of 1023 samples.

It is appreciated that the value of 8000 Hz of fine Doppler correction is not a hard limit. The particular frequency range depends on the basic signal-to-noise ratio of the input samples and the margin associated with this value. The matched filter Doppler correction is selectively applied to the complex phase of the stored samples. The Doppler of the PN code on the envelope of this phase is not corrected in the matched filter because it is corrected in the processing that is done before the samples are stored by means of the re-sampling from $$f = F_0 \frac{137}{32}$$

(approximately 44 MHz) down to $f=2F_0$ (approximately 20.46 MHz) that is controlled by the NCO frequency setting.

In this example, it is appreciated that both the PN code loading into the PN code register 304 and the Doppler mixing in mixer 314 occur faster than "real time." Preferably, a clock such as $f=2F_0$ would be used. Thus, once data samples are loaded in "real time," subsequent processing may selectively be faster than "real time."

When both the PN code and the Doppler-shifted signal samples are loaded into the PN code register 304 and signal sample register 310, respectively, the correlation process begins. Each complex signal sample is multiplied by its corresponding PN code chip. There are two samples for each code chip, or a pair of half chip spaced correlations for every two samples. All 2046 multiplications may selectively be done at once, since the process is a sign inversion. The resulting products are then input to an adder tree for summation and output as one millisecond of complex coherent integrations. A product/adder circuit 316 performs these functions.

The output of the product/adder circuit 316 is applied to a conventional envelope generator 318, which in the present example calculates the square root of the sum of squares (i.e., the envelope generator 318 may selectively be a square root circuit). The conventional envelope generator 318 determines the envelope of the one millisecond waveform. It is appreciated that this calculation removes any problems associated with signal inversions due to the 50 Hz data modulation on the GPS signal.

The I and Q outputs 320 are then further processed by non-coherently combining their envelope through a mixer 322 with any prior one millisecond correlations for this same PN code phase, previously stored in a storage device 324. A complete cycle of 20 summations is stored in the storage device 324 for each 20 ms PN code cycle. The storage device 324 may selectively be a RAM or other equivalent memory element.

After each such pair of half chip spaced correlations, the PN code register 304 is cyclically shifted by 1 chip, via shift path 308, and the process is repeated. After 1023 such shifts, all 2046 correlations are computed for the current one millisecond segment. At that point, the next 1 ms segment from the sample storage device 302 is Doppler multiplied and loaded into the signal sample register 310. Thus, the process is repeated for each of the 20 one millisecond segments stored in the sample storage device 302. After 20 ms have been processed, the output storage device 324 contains 2046 correlation values. This procedure may selectively be repeated for as many combinations of PN code and Doppler shift as desired.

The final correlation values in the output storage device 324 may be selectively available over the external bus 132 for further processing by other systems. The Doppler corrected matched filter system 100, FIG. 1, may then generate an interrupt to an external signal processor, which may selectively read out the results of the correlation process. As an example, the desired result may be the maximum value and its code phase (located in the storage device 324). However, in other examples, additional information may be required that is different for various applications. For example, samples adjacent to the maximum value may be utilized to provide information about the likelihood of the peak being a cross correlation signal. Smaller peaks at earlier phases may indicate a partially blocked line-of-sight path. The three or four adjacent peaks of a maximum peak may be employed to better define the optimum location of the true correlation peak. In an another example, the Doppler corrected matched filter system 100 may provide a specialized search function 326 that automatically provides the largest correlation value or values (i.e., 8 largest peaks) and the corresponding location (code phase) in the array of 2046 non-coherent sum values after all twenty segments have been processed.

Figure 4:
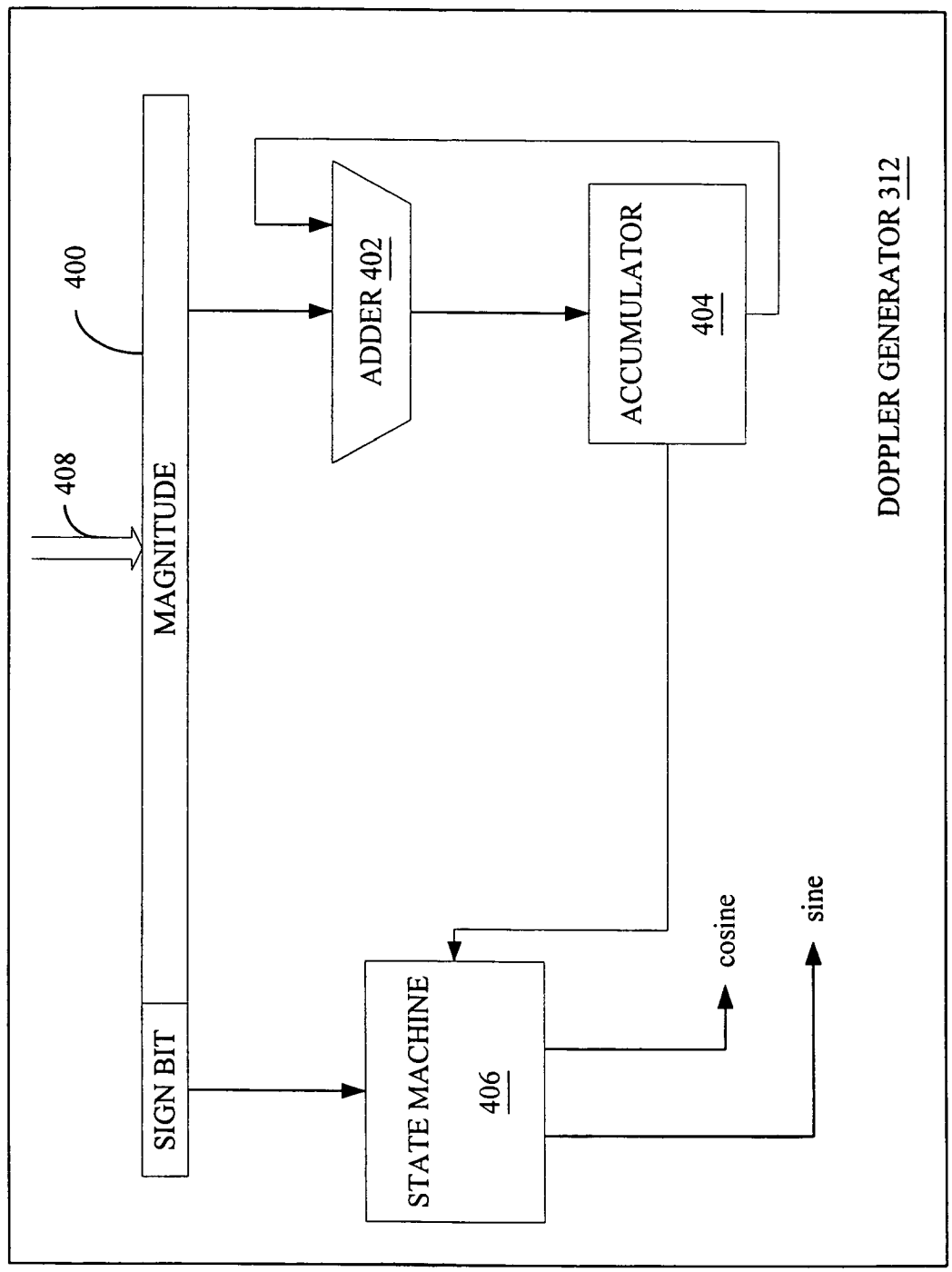
FIG. 4 is a block diagram of an example implementation of a Doppler generator shown in FIG. 3.
Figure 5:
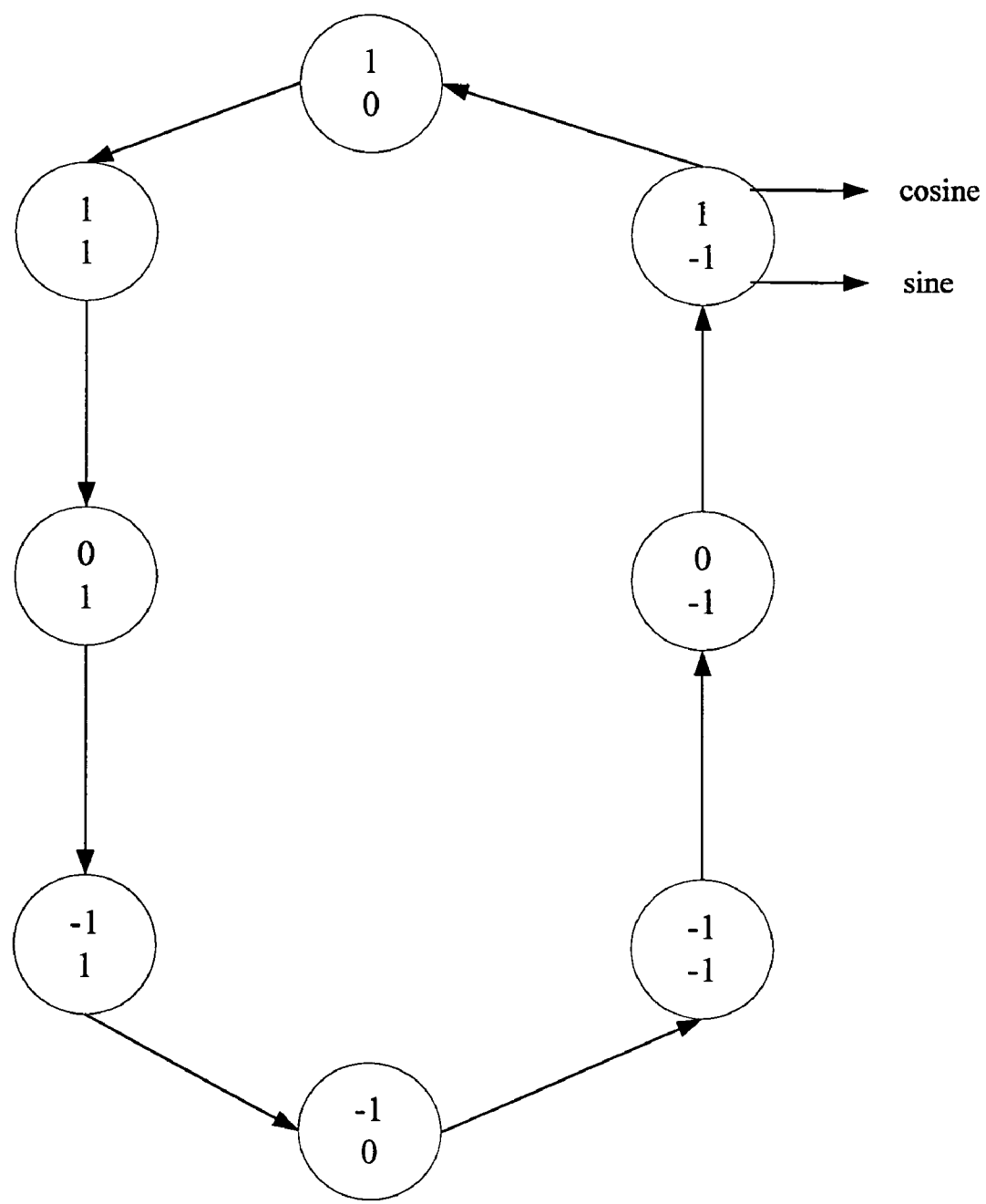
FIG. 5 is a state machine diagram for the state machine shown in FIG. 4.
Figure 6:
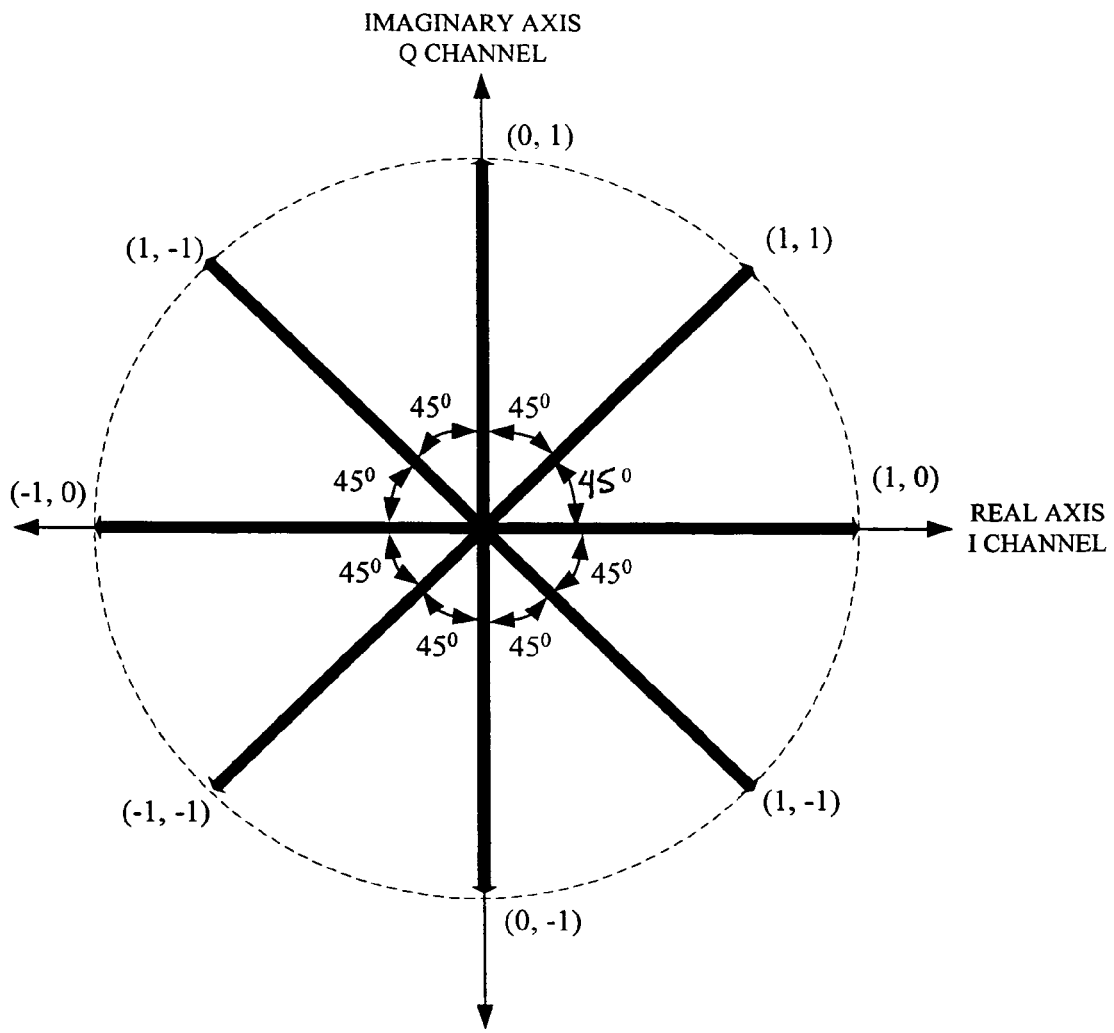
FIG. 6 is a phasor representation of the state machine diagram shown in FIG. 5.

FIG. 4 is a block diagram of an example implementation of a Doppler generator 312 shown in FIG. 3. The Doppler generator 312 includes a register 400 coupled to an adder 402, an accumulator register 404, and a state machine 406. FIG. 5 is a state machine diagram for the state machine 406 shown in FIG. 4. The output of the Doppler generator 312 is a multi-level (i.e., 3 levels) quantized complex phasor (i.e., $\cos\theta + j\sin\theta$ where $\theta$ is the phase of the phasor). The phase is quantized to 45 degrees. FIG. 6 is a phasor representation of the state machine diagram shown in FIG. 5.

In operation, a desired Doppler value is written over the bus 408, FIG. 4 (which may be in signal communication with complex mixer 314), into the register 400. The magnitude is added to the accumulator 404 at the same rate that memory elements such as words containing four complex samples are read from the sample storage device 302, FIG. 3. Whenever the accumulator 404 has an overflow condition, the state machine 406 is advanced or retarded one state, depending on the value of the sign bit. The overflow condition represents 45 degrees of accumulated Doppler. In an another example implementation, the Doppler generator 312 may be a lookup table (i.e., in RAM or read only memory "ROM") with stored pre-computed Doppler shift correction values.

3. Register and Summing Circuitry of the Matched Filter

Figure 7:
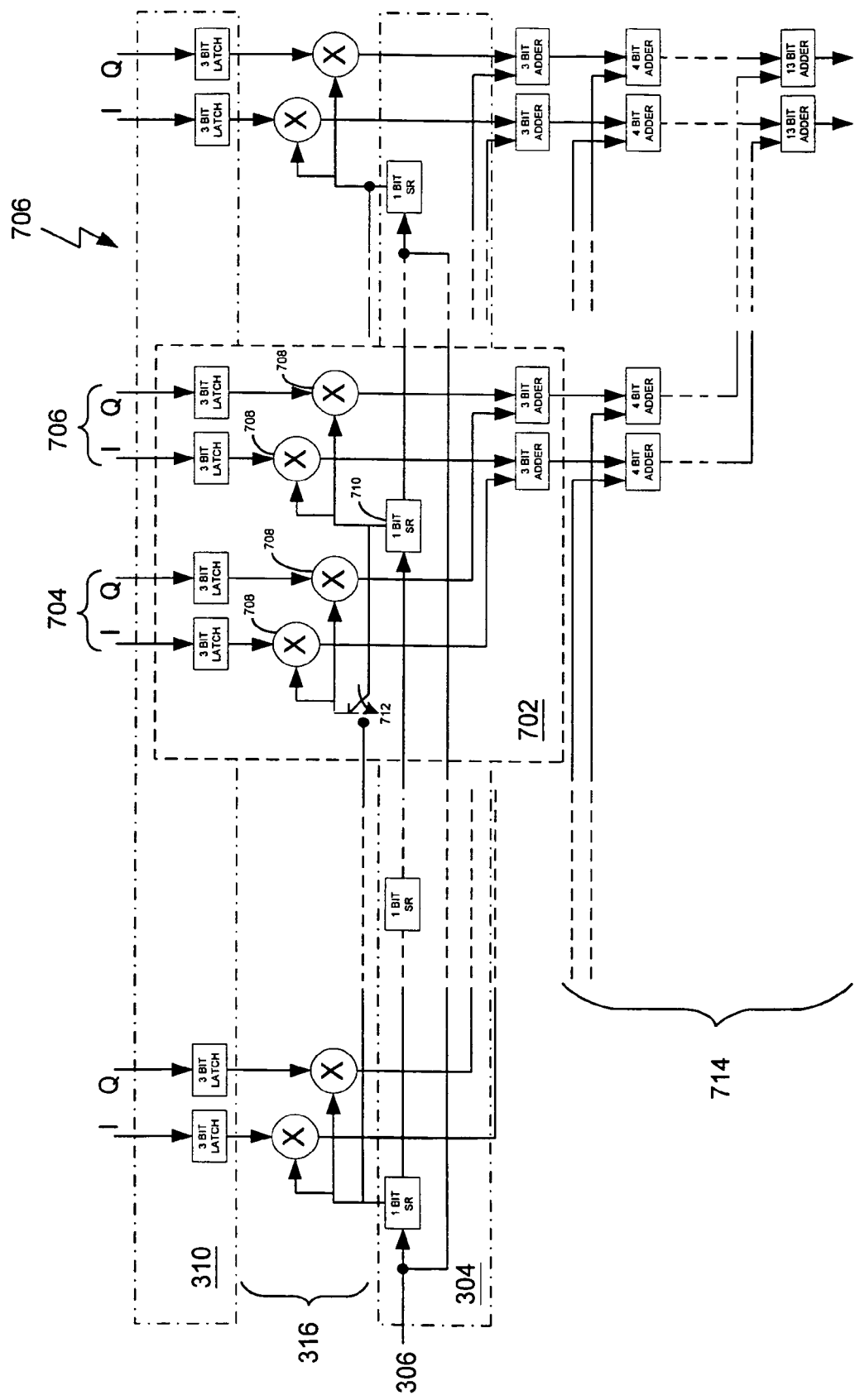
FIG. 7 is a logic diagram of one embodiment of the register and summing circuitry of the matched filter shown in FIG. 3.

FIG. 7 illustrates a logic diagram for a register and summing circuitry 700 in a matched filter. The register and summing circuitry 700 is used to despread a PN code from a spread spectrum signal in a matched filter. In this embodiment, a basic cell 702 is defined as including: two pairs 704, 706 of I and Q latches for storing input I and Q data samples each represented as two or three bit quantities that may have the values −1, 0 and −1 (or −2, −1, 0, 1, or 2 for three bits); corresponding one bit multipliers 708 for applying the PN chips as one bit quantities that have the values −1 and +1, hence, the multipliers 708 have the effect of changing the sign bit of the I and Q data values; a corresponding 1 bit shift register PN chip stage 710; and an odd-even switch 712 between cells 702 that allows each PN chip stage 710 to be applied to successive pairs of I and Q latches without shifting the PN code each time, thus saving power (i.e., this feature saves 1023 shift register stages and the power associated with making extra shifts).

The outputs of the multipliers 708 are coupled to an adder tree 714, which hierarchically adds all of the 2046 stages until final I and Q sums are output. The example adder tree 714 shown has 14 bit adders as the final stage. The width of the adders may selectively be reduced after a few stages. The register and summing circuitry is implemented in relatively few gates because the data widths involved in the basic cell 702 are small.

Figure 8:
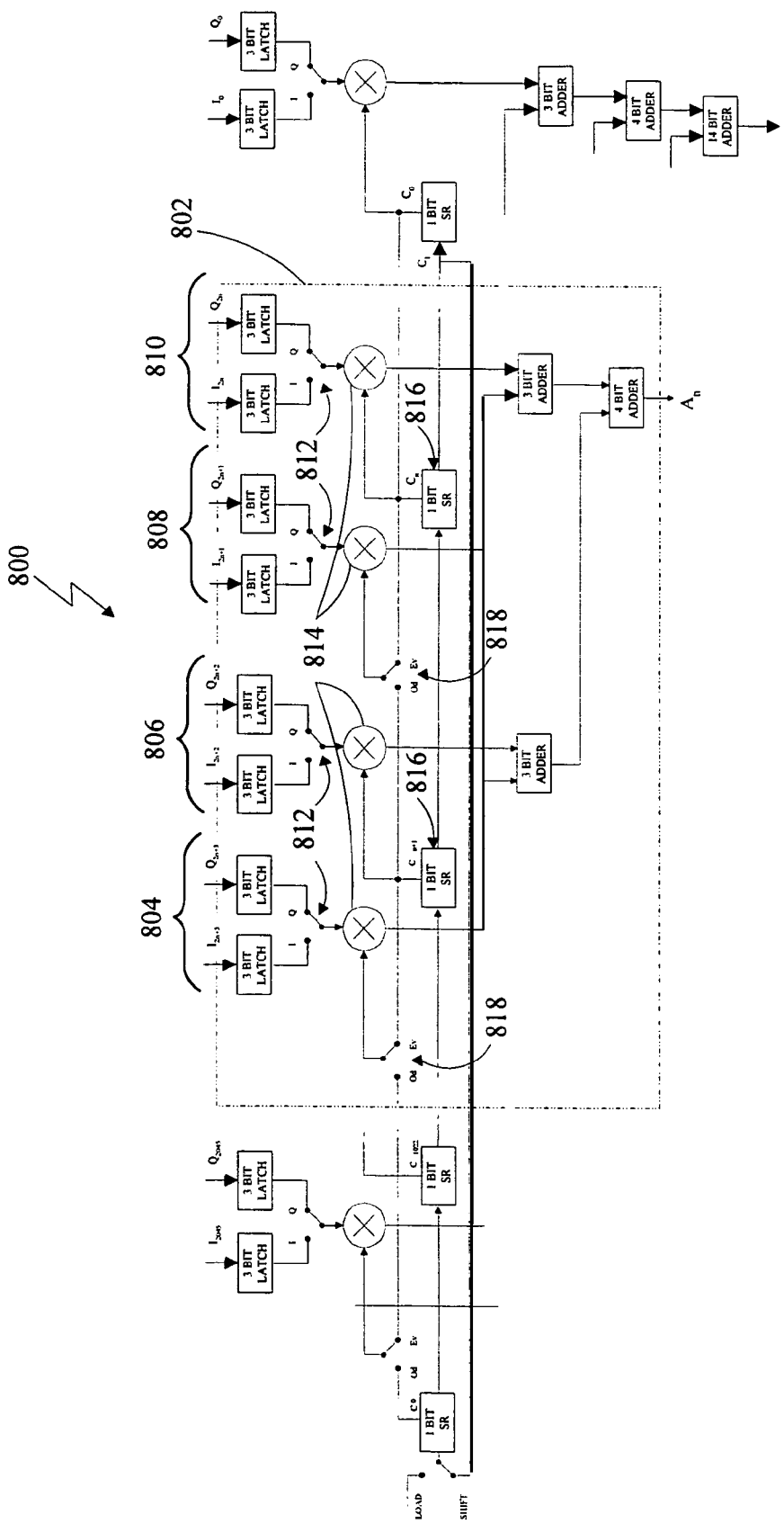
FIG. 8 is a logic diagram of a second embodiment of the register and summing circuitry of the matched filter shown in FIG. 3.

FIG. 8 illustrates a second embodiment for a register and summing circuitry 800 in a matched filter. A basic cell 802 in this embodiment includes: four pairs 804, 806, 808, 810 of I and Q latches for storing input I and Q data samples; corresponding I-Q switches 812 between the I and Q latches 804, 806, 808 and 810; one bit multipliers 814 for applying the PN chips; a corresponding 1 bit shift register PN chip stage 816; and two odd-even switches 818 that allow each PN chip stage 816 to be applied to successive pairs of I and Q latches without shifting the PN code. The register and summing circuitry 800 of FIG. 8 recognizes that the same calculations are performed for both the I and Q samples. Accordingly, FIG. 8 includes I-Q switches 812 to reduce the number of multipliers 814 to half the number of multipliers 708 shown in FIG. 7.

Figure 9:
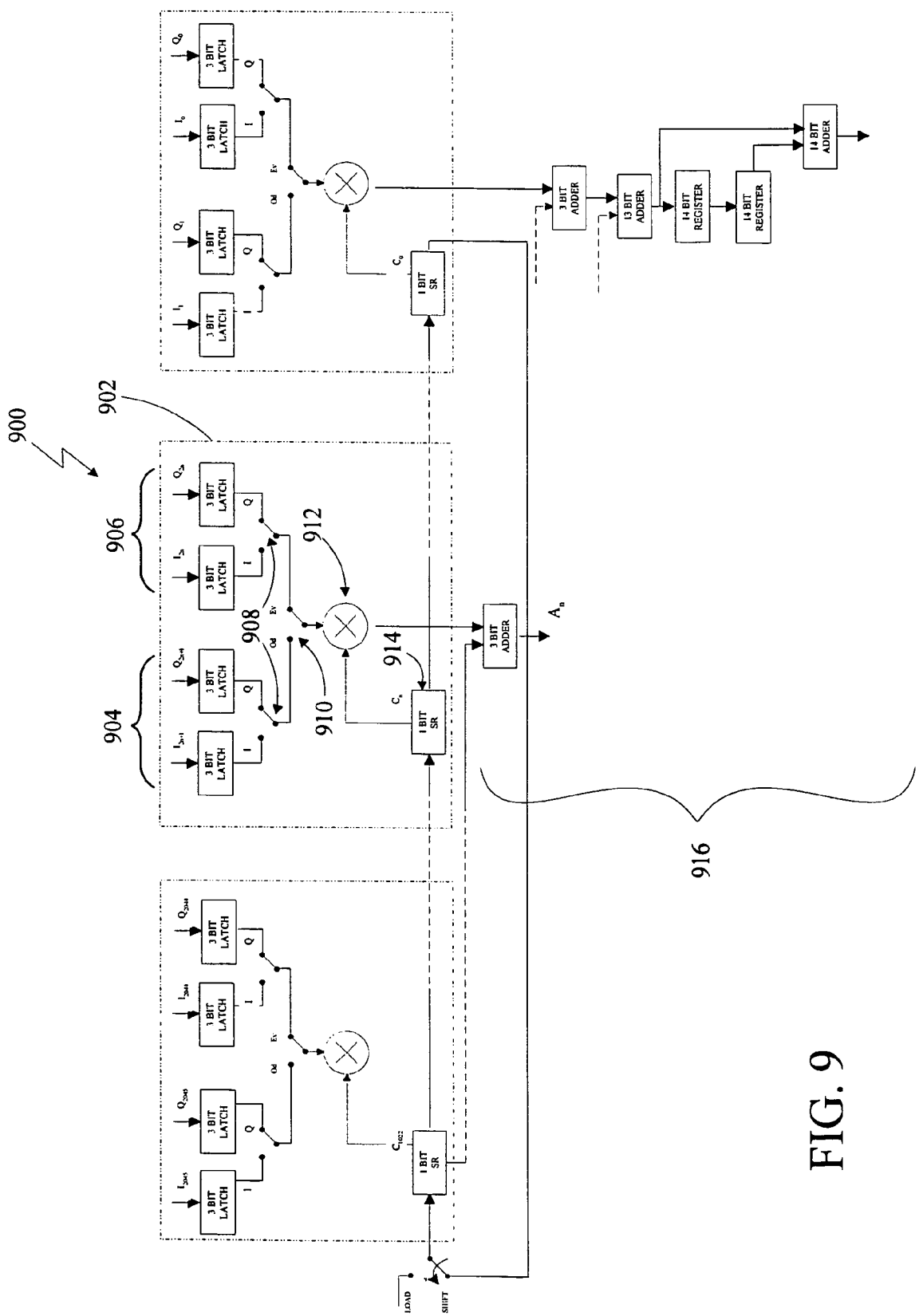
FIG. 9 is a logic diagram of a third embodiment of the register and summing circuitry of the matched filter shown in FIG. 3.

FIG. 9 illustrates a logic diagram for a third embodiment of the register and summing circuitry 900 of the matched filter 102 shown in FIG. 3. The basic cell 902 includes: two pairs 904, 906 of I and Q latches for storing input I and Q data samples; corresponding I-Q switches 908 between the I and Q latches 904, 906; an odd-even switch 910 between the I-Q switches 908; a multiplier 912; and a 1 bit shift register PN chip stage 914. The outputs of the multipliers 435 are coupled to an adder tree 916.

As shown in FIG. 9, the in-phase/quadrature-phase portion of the spread spectrum signal and the odd/even signal sample are selected prior to reaching the multiplier 912. In the circuitry 800 of FIG. 8, the odd/even signal sample is selected after the in-phase/quadrature-phase portion is multiplied by the PN code chip. Accordingly, the circuitry 900 of FIG. 9 uses half the number of multipliers as the circuitry 800 of FIG. 8.

FIG. 10 illustrates a table comparing the output $A_n$ 1000 of the basic cell of FIG. 9 with the output $A_n$ 1002 of the basic cell of FIG. 8. "C" 1004 represents the PN code chip currently being processed in the basic cell. There are two types of switches in each of the basic cells. In the table, an "O" indicates that the odd-even switch is in the odd state, an "E" indicates that the odd-even switch is in the even state, an "I" indicates that the I-Q switch is in the in-phase mode and a "Q" indicates that the I-Q switch is in the quadrature-phase mode. Thus, "EQ" in column 1006 identifies switches set to process "even" and "Q samples." Column 1008 identifies the combination of the outputs 1000 of the cells of FIG. 9 by row numbers 1010 which is equivalent to the output 1002 of the cells of FIG. 8. Accordingly, the adder tree 916 is designed to equate the register and summing circuitry 900 of FIG. 9 to the register and summing circuitry 800 of FIG. 8. Because the circuitry 900 in FIG. 9 uses half the number of multipliers as the circuitry 800 in FIG. 8, circuitry 900 in FIG. 9 requires less power than the circuitry 800 of FIG. 8.

4. Programming and Control

The Doppler corrected matched filter system 100 is envisioned as an independent subsystem that is controlled by a processor such as the controller 134 or other equivalent processor. The degree of autonomy required of the Doppler corrected matched filter system 100 depends primarily on its speed of operation. If the time required to search one code/Doppler bin is on the order of 10-20 ms, then the most likely mode of operation would be for the controller 134 to issue a command to do a load or search, have the Doppler corrected matched filter system 100 execute that command, and then have the controller 134 collect the results and issue a command for the next operation, if necessary. Alternatively, if the Doppler corrected matched filter system 100 is operated at very high speed, such as the 5000 one-millisecond segment searches per second mentioned above, it would likely be required that a sequence of commands be issued and that the Doppler corrected matched filter system 100 have an automated method, such as a direct memory access "DMA" capability, of delivering results to the controller 134.

After the controller 134 has read out all of the data required for the particular operation it is performing with the Doppler corrected matched filter system 100, the controller 134 may issue the next command, if necessary. Thus, the Doppler corrected matched filter system 100 may operate asynchronously, as rapidly as the controller 134 may process its output results.

When the invention is used to acquire the signal of a GPS satellite, the objective for the Doppler corrected matched filter system 100 during initial acquisition is to get enough satellites in track to support navigation within one second. Because of the inexpensive frequency standard technology used, this may require searching 10-20 Doppler bins until the first satellite is acquired. In cold start conditions (where some system initialization information is lacking), it may be necessary to search for 2-3 satellites before a visible satellite is selected. Therefore, it is necessary to be able to search 50 to 100 Doppler bins per second to meet this objective. This search rate is consistent with allowing a current-technology microprocessor to control the Doppler corrected matched filter system 100 one command at a time.

Accordingly, under these assumptions, the command set for the Doppler corrected matched filter system 100 may be relatively simple. The following example commands may be implemented:

X LOAD SIGNAL SAMPLES: At the beginning of the next T20 interval, the Doppler corrected matched filter system 100 would begin loading 20 ms of signal samples.

X INPUT FREQUENCY: A register is required to specify the nominal frequency shift to use while the signal samples are loaded. Assuming reuse of the carrier and code NCO and generation circuits 120, 122 and 124, FIG. 1, this interface may be based on those designs.

X EXECUTE SEARCH: The Doppler corrected matched filter system 100 would immediately execute a correlation search based on the programmed search parameters.

Search parameter registers could be programmed to store the following values:

X DOPPLER SHIFT: This is a Doppler shift applied to the stored signal as each 1 ms segment is loaded into the signal sample register 310. For example, there may be on the order of 16 or so Doppler values, representing shifts of 750*n Hz, where n=0 though 15.

X PN CODE: This register would likely be used in association with the existing code generator 124. The new function would be to inform the Doppler corrected matched filter system 100 that a new PN code is required, so that the code would be generated and loaded into the code register 304 for use in the next, and subsequent, correlation searches.

5. Program Implementation

For performance purposes with current technology, the invention is preferably implemented in dedicated circuitry. However, the functions performed by the invention may also be implemented in generalized programmable circuitry capable of generating the following steps:

(1) Receive and store an input sample of a complex signal to be Doppler shift corrected and correlated to a code signal; optionally limit the received complex signal in value range and/or sampling frequency.
(2) Complex mix at least a portion of the stored input sample with a Doppler shift correction value.
(3) Compute the complex products of the mixed portion of the stored input sample with a current code phase of the code signal.
(4) Sum the computed complex products as a current complex integration value.
(5) Compute, such as generating an envelope, (and normally store) the square root of the sum of the squares of the current complex integration value.
(6) Shift the code signal to a next current code phase.
(7) Repeat steps (3) through (6) for the current code phase of the code signal.
(8) Output the code phase and magnitude of the stored computed square root value having the largest magnitude as an indication of correlation between the input sample and the code signal, corrected for Doppler shift.

The following is an example pseudo-code version of one example implementation of a matched filter 102 in accordance with the invention:

```
// Matched Filter Algorithm Pseudo-code
// This version assumes that the samples are loaded with the
// digital IF Fo/8 plus the nominal estimated frequency error
// already removed. The complex spectrum is then centered
// near zero Hz. Further complex frequency shifts will be made
// to search other Doppler bins. The IF has to be removed before
// the sample rate is reduced from 20/Tca to 2/Tca. The analog
// bandwidth is a little too wide for this sampling rate. It has
// to be verified that the PN waveform is as tolerant as expected
// to the resulting aliasing.
// ****** Load the matched filter ********
// This operation is real time, in the sense that the samples are
// being created by a clock that has to sample uniformly in time.
// So, these samples have to be stored as fast as they are received.
// Subsequent processing in the MF can be non-real time (either
// faster or slower).
#define SAMPLES_PER_MS (2046) // Sampling at 2/Tca = 2.046 MHz
#define NUMBER_OF_MS (20)
// The signal samples are complex values (1, Q). Each component,
// in-phase or quadrature, can take on three values: –1, 0, +1. In the
// hardware before the MF, these samples are represented by two bits each
// for I and Q
int s[NUMBER_OF_MS][SAMPLES_PER_MS][2];
int i, j;
for( i = 0; i < NUMBER_OF_MS; i++ )      // each one ms segment
{
   for( j = 0; j < SAMPLES_PER_MS; j++ )    // each complex sample in the ms
   {
      s[i][j][0] = Get_I_Phase_Sample( );   // three-valued, two bit I sample
      s[i][j][1] = Get_Q_Phase_Sample( );   // three-valued, two bit Q sample
   }
}
// ******* Load GPS PN Code ****************
// GPS PN codes could be generated as needed by code generator (re-use design
// from signal processor channels). Alternatively, they could be stored in a ROM.
// Each chip is one bit representing the values –1 and +1.
#define CHIPS_IN_CODE (1023)    // periodic length of GPS PN codes
#define NUMER_OF CODES (32)        // number of GPS codes (ignoring
pseudolites
                                    // and WAAS codes)
int c[NUMBER_OF_CODES][CHIPS_IN_CODE];       // Assume ROM storage
notation.
// ******* Load Doppler Signal *************
// The notation here assumes that the complex signals to mix the various Doppler
values
// to dc are stored in a ROM as complex values. That is not a likely implementation,
// but makes the math easier to visualize. The values are assumed to be 5 level signals
// like the normal signal processing channels use. Most likely, the generator used
// in the normal signal processing channels could be used as a starting point. Simpler
// implementations using two level quantization (–1, +1) are likely.
#define NUMBER_OF_DopplerS (16)
int d[NUMBER_OF_DopplerS][SAMPLES_PER_MS][2];
for( code = 0; code < NUMER_OF_CODES; code++ ) // process each code
{
   for( dop = 0; dop < NUMBER_OF_DopplerS; dop++ ) // process each Doppler
shift
   {
      for( seg = 0; seg < NUMBER_OF_MS seg; ++ ) // process each ms
      {
```

```
                for( sample = 0; sample < SAMPLES_PER_MS; sample++ ) // do Doppler
shift while loading 1 ms signal register
                {
                        s_1ms[sample][RE] = d[dop][sample][RE] * s[seg][sample][RE] –
d[dop][sample][IM] *
                                                s[seg][sample][IM];
                        s_1ms[sample][IM] = d[dop][sample][IM] * s[seg][sample][RE] +
d[dop][sample][RE] *
                                                s[seg][sample][IM];
                }
                for( shift = 0; shift < CHIPS_IN_CODE; shift++ ) // process each phase shift
of the code
                {
half_shift = 2 * shift;
for( half_chip = 0; half_chip < 2; half_chip++ ) // two samples per chip
// ******* Run the Matched Filter **********
// This version assumes that as each segment is loaded from RAM into a 1 ms long
latch
// for correlation with the PN code, the Doppler signal is applied.
int code;    // which pn code is being processed
int sample;   // which sample is being processed
int shift;    // which of the code phases is being processed
int half_shift;// because there are two samples per chip
int seg;     // which one ms signal segment is being processed
int dop;     // which Doppler bin is being processed
int chip;    // which chip is being processed
int r_ms;    // ms accumulator, real part
int i_ms;    // ms accumulator, imaginary part
int sum_20ms[SAMPLES_PER_MS];    // 20 ms non-coherent accumulators
int s_1ms[SAMPLES_PER_MS][2]; // Current 1 ms of Doppler shifted signal
#define RE (0)
#define IM (1)
// here we are showing that all codes, Dopplers and phase shifts are processed.
// We may want to be able to select a sub-range, list, or single one of these.
// There are probably some command registers to specify ranges & modes of
operation.
                if(seq == 0)     // zero the 2046 non-coherent 20 ms integrator on first
segment
                {
                sum_20ms[half_shift + half_chip] = 0;
                }
                r_20ms = 0    // zero the coherent 1 ms integrators
                i_20ms = 0;
                for( sample = 0; sample < SAMPLES_PER_MS; sample++ ) // form 1
ms sums
                {
                        chip = (sample + half_chip)/2;    // stays the same for two consecutive
samples
                        // The sum can change only by –2, –1, 0, +1, or +2 at each pass
                        // There is a way to use 5 level (rather than 3 level) Doppler signals and
still have only
                        // these change values. This results in less implementation loss of C/No.
                        // The last half chip of the last sample might just he skipped, if it helps.
r_ms += c[code][(shift + chip)%CHIPS_IN_CODE] * (s_1ms[sample][RE]);
                        i_ms += c[code][shift+chip]%CHIPS_IN_CODE] * (
s_1ms[sample][IM] );
                }
// The sqrt of the sum of squares (envelope) can be approximated by:
        // max_abs = MAX( |r_ms|, |i_ms| );
        // min_abs = MIN( |r_ms|, |i_ms| );
        // sum_20ms = max_abs + min_abs/2;
sum_20ms[half_shift + half_chip] += sqrt( r_ms * r_ms + i_ms * i_ms );   // exact
value of envelope
} // end of half chip
} // end of code shift
} // end of 1 ms segment
// The 20 ms second sums for this code and Doppler are complete.
//
// Alternatives at this point include
// 1. Interrupt processor to inspect 20 ms sums
//      (a lot of throughput, but might want in case of limited search).
// 2. Hardware search for N largest values and their locations; store for processor.
    // 3. Hardware search for largest value and its location. Store for processor. May not
be adequate.
    // 4. Store every value arid location above a threshold. Store for processor.
    // 5. Hardware search for largest value. Store value and location for processor.
Interrupt processor and
    //   halt the MF until re-enabled by processor. Then continues with next search.
// Below shows illustration for largest value.
```

-continued

```
    MaxLoc = -1;
    MaxVal = -1;
    for( sample = 0; sample < SAMPLES_PER_MS; sample++ )
    {
        if( sum_20ms[sample] > MaxVal )
        {
            MaxVal = sum_20ms[sample];
            MaxLoc = sample;
        }
    }
// Interrupt processor. Processor has until next start of search to get results.
        // Might want to have a mode that suspends until interrupt is acknowledged.
        // This would be useful if the processor were going to search the 20 ms sums itself or
        // extract some other data.
    Interrupt(MF_Complete);
    } // end of one Doppler bin
    } // end of one pn code choice
    MF_Idle( ); //    Go to sleep. No clocks, no/low power.
```

The software, which comprises an ordered listing of executable instructions for implementing logical functions, may selectively be embodied in any computer-readable medium for use by or in connection with an instruction execution system, apparatus, or device, such as a computer-based system, processor-containing system, or other system that may selectively fetch the instructions from the instruction execution system, apparatus, or device and execute the instructions. In the context of this document, a "computer-readable medium" is any means that may contain, store, communicate, propagate, or transport the program for use by or in connection with the instruction execution system, apparatus, or device. The computer readable medium may selectively be, for example but not limited to, an electronic, magnetic, optical, electromagnetic, infrared, or semiconductor system, apparatus, device, or propagation medium. More specific examples "a non-exhaustive list" of the computer-readable medium would include the following: an electrical connection "electronic" having one or more wires, a portable computer diskette (magnetic), a RAM (electronic), a read-only memory "ROM" (electronic), an erasable programmable read-only memory (EPROM or Flash memory) (electronic), an optical fiber (optical), and a portable compact disc read-only memory "CDROM" (optical).

6. Implementation in Network Assisted Environment

Figure 11:
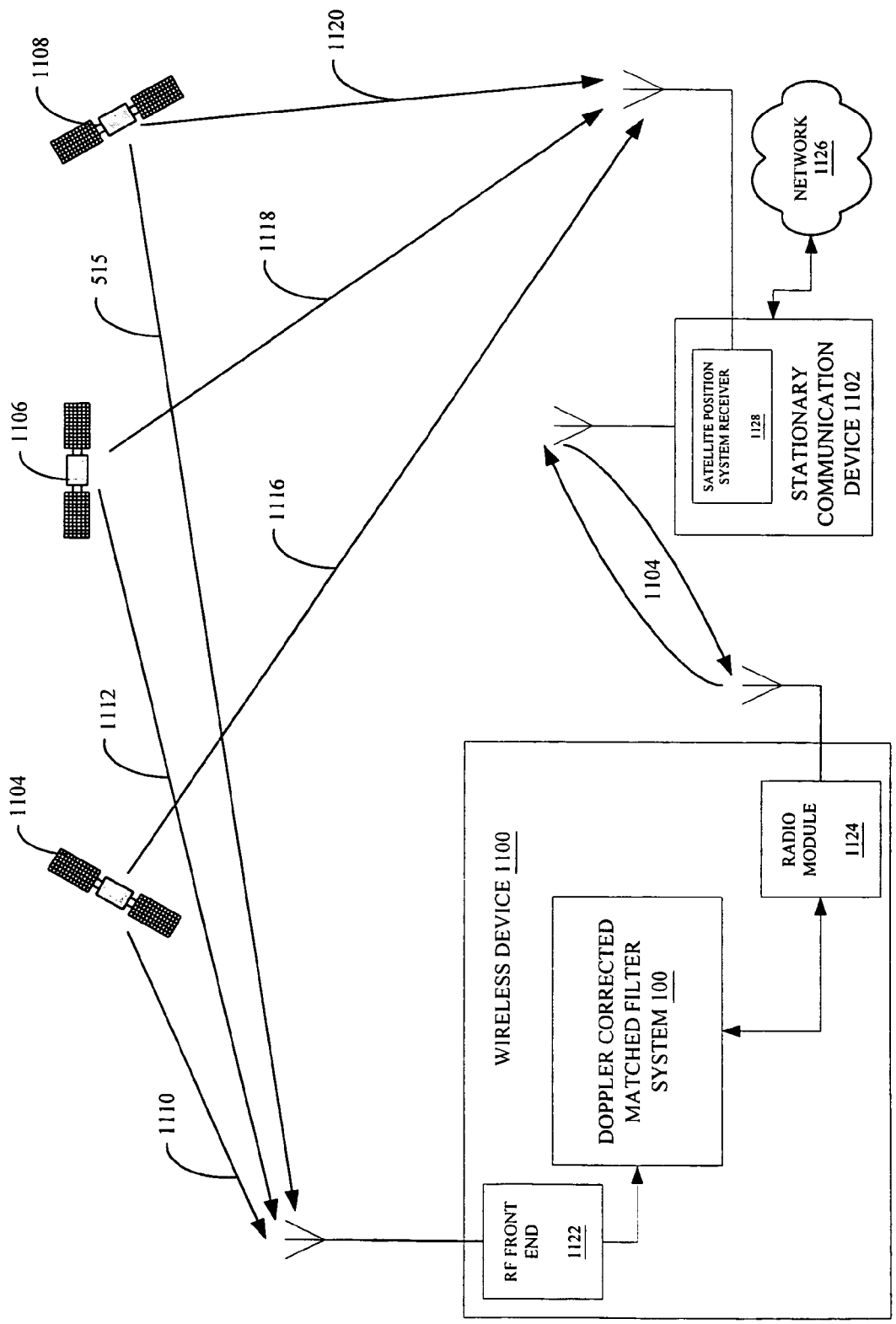
FIG. 11 illustrates an implementation of the matched filter system in a network assisted environment.

The Doppler corrected matched filter system 100 of the present invention may be incorporated in a positioning system that includes satellites and/or pseudolites (base stations) to triangulate the position of a receiver. FIG. 11 illustrates an example implementation of the matched filter system 100 in a network assisted environment. FIG. 11 shows a radio frequency receiver, in the form of a wireless device 1100, in signal communication with a stationary communication device 1102 (such as a base station or other network communication device) via signal path 1104. The wireless device 1100 receives signals from a number of satellites 1104, 1106 and 1108 via signal paths 1110, 1112 and 1114, respectively, and the stationary communication device 1102 receives signals from the satellites 1104, 1106 and 1108 via signal paths 1116, 1118 and 1120, respectively. The wireless device 1100 includes an RF front end 1122 (similar to RF front end 128 in FIG. 1), the matched filter system 100, FIG. 11, and a radio module 1124.

In FIG. 11, a network 1126 is used to assist the wireless device 1100 to find the signals from the satellites 1104, 1106 and 1108. The stationary communication device 1102 is part of the network 1126 and includes a satellite positioning system receiver 1128 that receives satellite data messages or signals from the satellites 1104, 1106 and 1108. The stationary communication device 1102 is assumed to receive the signal approximately error free because it will have a clear view of the sky and will not have any obstructions blocking the signals. In the network 1126, there may be numerous devices similar to the stationary communication device 1102. For convenience only, one stationary communication device 1102 is shown; however, it is appreciated that the following description is equally valid with multiple stationary communication devices. Additionally, only three of the approximately 12 available satellites are shown.

The geographic position of a wireless device may be calculated once a sufficient number of satellite signals are received at the wireless device. U.S. Pat. No. 5,812,087 entitled "Method And Apparatus For Satellite Positioning System Based Time Measurement," issued to Norman F. Krasner on Sep. 22, 1998, which is incorporated by reference, describes a method and apparatus for measuring time related to satellite data signals in satellite positioning systems. The measured time is used to calculate the position of the wireless device. U.S. Pat. No. 5,812,087 discloses the method and apparatus for establishing receiver timing at the wireless device by having a GPS receiver of the wireless device form an estimate of a portion of the satellite data message and transmit the estimate to a base station. The base station compares this estimate with a record of the satellite data signals received from another GPS receiver at the base station. The comparison determines which portion of the base station's data most closely matches the data transmitted by the wireless device and the result of the comparison is transmitted back to the wireless device for reference. The time measurements may also be implemented in the system described in U.S. Pat. No. 5,945,944, entitled "Method And Apparatus For Determining Time For GPS Receivers," issued to Norman F. Krasner on Aug. 31, 1999, which is incorporated by reference.

U.S. Pat. No. 5,945,944 discloses a method and apparatus of determining the time for a global positioning system receiver. Timing signals derived from a communication system, such as cellular phone transmission signals, are received by a GPS receiver and decoded to provide accurate time information. The timing signals may be in the form of synchronized events marked by timing indicators, or as system time information. The timing signals in combination with satellite position signals received by the GPS receiver are used to determine the position of the GPS receiver. The time measurements may also be implemented in an obstructive environment by the system described in U.S. Pat. No. 5,831,574, entitled "Method And Apparatus For Determining The Location Of An Object Which May Have An Obstructed View Of The Sky," issued to Norman F. Krasner on Nov. 3, 1998 and U.S. Pat. No. 6,016,119, entitled "Method And Apparatus For Determining The Location Of An Object Which May Have An Obstructed View Of The Sky," issued to Norman F. Krasner on Jan. 18, 2000, which are both incorporated by reference.

U.S. Pat. No. 5,831,574 discloses a positioning sensor that receives and stores a predetermined record length of positioning signals while in a fix position located such that the positioning sensor can receive positioning signals. Thereafter, the stored positioning signals are processed to determine the geographic location of the fix position. The fix position may correspond to a location of an object of interest or it may be in a known location relative to the position of the object, in which case once the geographic location of the fix position has been computed, the geographic location of the object can be derived. The positioning sensor includes a Snapshot OPS receiver which may collect and process GPS signals transmitted by GPS satellites using fast convolution operations to compute pseudoranges from the GPS satellites to the fix position. Alternatively, these computations may be performed at a basestation. The computed pseudoranges may then be used to determine the geographic location of the fix position. The positioning sensor may be equipped with a depth sensing element, such as a pressure sensor, which allows a determination of the depth of a submerged object to be made. The positioning sensor may further be equipped with signal detecting means for determining when the positioning sensor is in the fix position.

U.S. Pat. No. 6,016,119 discloses a positioning sensor which receives and stores a predetermined record length of positioning signals while in a fix position located such that the positioning sensor can receive positioning signals. Thereafter, the stored positioning signals are processed to determine the geographic location of the fix position. The fix position may correspond to a location of an object of interest or it may be in a known location relative to the position of the object, in which case once the geographic location of the fix position has been computed, the geographic location of the object can be derived. The positioning sensor includes a Snapshot GPS receiver which may collect and process GPS signals transmitted by GPS satellites using fast convolution operations to compute pseudoranges from the GPS satellites to the fix position. Alternatively, these computations may be performed at a basestation. The computed pseudoranges may then be used to determine the geographic location of the fix position. The positioning sensor may be equipped with depth sensing means, such as a pressure sensor, which allows a determination of the depth of a submerged object to be made. The positioning sensor may further be equipped with signal detecting means for determining when the positioning sensor is in the fix position.

After processing by the cancellation system, the wireless device may make the time measurements based on the system described in U.S. Pat. No. 5,884,214, entitled "GPS Receiver And Method For Processing GPS Signals," issued to Norman F. Krasner on Mar. 16, 1999, which is incorporated by reference. U.S. Pat. No. 5,884,214 discloses a global positioning system (GPS) receiver having first circuitry for receiving and processing pseudorandom sequences transmitted by a number of GPS satellites. The first circuitry is configured to perform conventional correlation operations on the received pseudorandom sequences to determine pseudoranges from the GPS receiver to the GPS satellites. The GPS receiver also includes second circuitry coupled to the first circuitry. The second circuitry is configured to receive and process the pseudorandom sequences during blockage conditions. The second circuitry processes the pseudorandom sequences by digitizing and storing a predetermined record length of the received sequences and then performing fast convolution operations on the stored data to determine the pseudoranges. The GPS receiver may have a common circuitry for receiving CPS signals from in view satellites and downconverting the RF frequency of the received GPS signals to an intermediate frequency (IF). The IF signals are split into two signal path, a first of which provides the conventional correlation processing to calculate the pseudoranges. During blockage conditions, the IF signal is passed to the second signal path wherein the IF signals are digitized and stored in memory and later processed using the fast convolution operations to provide the pseudoranges. Alternative arrangements for the two signal paths include separate downconverters or shared digitizers. One embodiment provides both signal paths on a single integrated circuit with shared circuitry executing computer readable instructions to perform GPS signal processing appropriate to the reception conditions.

Additionally, the wireless device may make the time measurements based on the system described in U.S. Pat. No. 5,781,156, entitled "GPS Receiver And Method For Processing GPS Signals," which is incorporated by reference. U.S. Pat. No. 5,781,156 discloses a GPS receiver in one embodiment which includes an antenna which receives GPS signals at an RF frequency from in view satellites; a downconverter coupled to the antenna for reducing the RF frequency of the received GPS signals to an intermediate frequency (IF); a digitizer coupled to the downconverter and sampling the IF GPS signals at a predetermined rate to produce sampled IF GPS signals; a memory coupled to the digitizer storing the sampled IF GPS signals (a snapshot of GPS signals); and a digital signal processor (DPS) coupled to the memory and operating under stored instructions thereby performing Fast Fourier Transform (FFT) operations on the sampled IF GPS signals to provide pseudorange information. These operations typically also include preprocessing and post processing of the GPS signals. After a snapshot of data is taken, the receiver front end is powered down. The GPS receiver in one embodiment also includes other power management features and includes, in another embodiment, the capability to correct for errors in its local oscillator which is used to sample the GPS signals. The calculation speed of pseudoranges, and sensitivity of operation, is enhanced by the transmission of the Doppler frequency shifts of in view satellites to the receiver from an external source, such as a basestation in one embodiment of the invention.

Additionally, an example implementation of the time measurement utilizing the assistance of a base station may be implemented in the system described in U.S. Pat. No. 5,874,914, entitled "GPS Receiver Utilizing A Communication Link," issued to Norman F. Kasner on Feb. 23, 1999, which is incorporated by reference. U.S. Pat. No. 5,874,914 discloses a GPS receiver in one embodiment which includes an antenna which receives GPS signals at an RF frequency from in view satellites; a downconverter coupled to the antenna for reducing the RF frequency of the received GPS signals to an intermediate frequency (IF); a digitizer coupled to the downconverter and sampling the IF GPS signals at a predetermined rate to produce sampled IF GPS signals; a memory coupled to the digitizer storing the sampled IF GPS signals (a snapshot of GPS signals); and a digital signal processor (DPS) coupled to the memory and operating under stored instructions thereby performing Fast Fourier Transform (FFT) operations on the sampled IF GPS signals to provide pseudorange information. These operations typically also include preprocessing and post processing of the GPS signals. After a snapshot of data is taken, the receiver front end is powered down. The GPS receiver in one embodiment also includes other power management features and includes, in another embodiment, the capability to correct for errors in its local oscillator which is used to sample the GPS signals. The calculation speed of pseudoranges, and sensitivity of operation, is enhanced by the transmission of the Doppler frequency shifts of in view satellites to the receiver from in external source, such as a basestation in one embodiment of the invention.

Additionally, another example implementation of the time measurement utilizing the assistance of a base station may be implemented in the system described in U.S. Pat. No. 5,841, 396, entitled "GPS Receiver Utilizing A Communication Link," issued to Norman F. Krasner on Nov. 24, 1998, which is incorporated by reference. U.S. Pat. No. 5,841,396 discloses a precision carrier frequency signal for calibrating a local oscillator of a GPS receiver which is used to acquire GPS signals. The precision carrier frequency signal is used to calibrate the local oscillator such that the output of the local oscillator, which is used to acquire GPS signals, is modified by a reference signal generated from the precision carrier frequency signal. The GPS receiver locks to this precision carrier frequency signal and generates the reference signal. In another aspect of the invention, satellite almanac data is transmitted to a remote GPS receiver unit from a base station via a communication link. The remote GPS receiver unit uses this satellite almanac data to determine approximate Doppler data for satellites in view of the remote GPS receiver unit.

Still another example implementation of the time measurement utilizing the assistance of a base station may be implemented in the system described in U.S. Pat. No. 5,999,124, entitled "Satellite Positioning System Augmentation With Wireless Communication Signals," issued to Leonid Sheynblant on Dec. 7, 1999, which is incorporated by reference. U.S. Pat. No. 5,999,124 discloses a method and apparatus for processing position information from satellite positioning system satellites and from cellular based communication signals. In one example of a method according to the invention, a SPS receiver receives SPS signals from at least one SPS satellite. This SPS receiver is coupled to and typically integrated with a communication system which receives and transmits messages in a cell based communication system. In this method, a message is transmitted in the cell based communication signals between a communication system and a first cell based transceiver. A time measurement which represents a time of travel of a message in the cell based communication signals between the cell based transceiver and the communication system is determined. Another time measurement that represents a time of travel of the SPS signals is also determined. A position of the SPS receiver is determined from a combination of at least the time measurement which represents the time of travel of a message in the cell based communication signals and from a time measurement which represents a time travel of the SPS signals. The cell based communication signals are capable of communicating data messages in a two-way direction in one embodiment between the cell based transceiver and the communication system.

Another example implementation of the time measurement utilizing the assistance of a base station may be implemented in the system described in U.S. Pat. No. 6,002,363, entitled "Combined GPS Positioning System And Communications System Utilizing Shared Circuitry," issued to Norman F. Krasner and is incorporated by reference. U.S. Pat. No. 6,002, 363 discloses a combined GPS and communication system having shared circuitry. The combined system includes an antenna for receiving data representative of GPS signals, a frequency converter coupled to the antenna, a frequency synthesizer coupled to the frequency converter, an analog to digital converter coupled to the frequency converter and a processor coupled to the frequency converter. The processor processes the data representative of GPS signals to determine a pseudorange based on the data representative of GPS signals to determine a pseudorange based on the data representative of GPS signals. The integrated communication receiver includes a shared component which is at least one of the antenna, the frequency converter, the frequency synthesizer and the analog to digital converter. Typically, in certain embodiments, the processor also demodulates communication signals received as well as controls the modulation of data to be transmitted as a communication signal through a communication link.

While various embodiments of the application have been described, it will be apparent to those of ordinary skill in the art that many more embodiments and implementations are possible that are within the scope of this invention. Accordingly, the invention is not to be restricted except in light of the attached claims and their equivalents.

What is claimed is:

1. A system for despreading a spread spectrum signal using a pseudo-noise ("PN") code, wherein the spread spectrum signal comprises a plurality of signal samples, each signal sample having an in-phase portion and a quadrature-phase portion, and wherein the PN code comprises a plurality of PN code chips, the system comprising:
   a switch for selecting one of the in-phase portion and the quadrature-phase portion of a first signal sample of the plurality of signal samples;
   a first multiplier coupled to the switch for multiplying the selected portion of the first signal sample with a first PN code chip of the plurality of PN code chips to obtain a first product, where the selected portion of the signal sample is first provided to an odd-even switch and is either an even portion or an odd portion of the selected portion of the first signal sample;
   a second multiplier coupled to a switch for multiplying a selected portion of a second signal sample of the plurality of signal samples with the first PN code chip to obtain a second product, wherein the second signal sample succeeds the first signal sample, where the selected portion of the second signal sample is first provided to the odd-even switch and is either an even portion or an odd portion of the selected portion of the second signal sample; and
   a first adder coupled to the first multiplier and the second multiplier for adding the first product with the second product to obtain a first sum.

2. The system of claim 1, further comprising:
   a third multiplier coupled to a second switch for multiplying a selected portion of a third signal sample with a second PN code chip of the plurality of PN code chips, wherein the third signal sample succeeds the second signal sample and wherein the second PN code chip succeeds the first PN code chip and the selected portion of the third signal sample is selected with a second odd-even switch and is either an even portion or an odd portion of the selected portion of the third signal sample;
   a fourth multiplier coupled to the second switch for multiplying a selected portion of a fourth signal sample with the second PN code chip to obtain a fourth product, wherein the selected portion of the fourth signal sample succeeds the third signal sample and the selected portion of the fourth signal sample is provided to the second odd-even switch and is either an even portion or an odd portion of the selected portion of the fourth signal sample;

a second adder coupled to the third multiplier and the fourth multiplier for adding the third product with the fourth product to obtain a second sum; and a third adder coupled to the first adder and the second adder for adding the first sum with the second sum.

3. A method for despreading a spread spectrum signal using a PN code, wherein the spread spectrum signal comprises a plurality of signal samples, each signal sample having an in-phase portion and a quadrature-phase portion, and wherein the PN code comprises a plurality of PN code chips, the method comprising:

selecting one of the in-phase portion and the quadrature-phase portion of a first signal sample of the plurality of signal samples;

combining the selected portion of the first signal sample with a first PN code chip of the plurality of PN code chips to obtain a first product, where the selected portion is either an odd portion or an even portion of the selected portion of the first signal sample as selected by an odd-even switch;

combining the selected portion of a second signal sample of the plurality of signal samples with the first PN code chip to obtain a second product, wherein the second signal sample succeeds the first signal sample, where the selected portion is either an odd portion or an even portion of the selected portion of the second signal sample as selected by the odd-even switch; and grouping the first product with the second product to obtain a first sum.

4. The method of claim 3, further comprising:

combining a selected portion of a third signal sample of the plurality of signal samples with a second PN code chip from the plurality of PN code chips to obtain a third product, wherein the third signal sample succeeds the second signal sample and wherein the second PN code chip succeeds the first PN code chip and the selected portion is either an odd portion or an even portion of the selected portion of the third signal sample as selected by a second odd-even switch;

combining the selected portion of a fourth signal sample of the plurality of signal samples with the second PN code chip to obtain a fourth product, wherein the fourth signal sample succeeds the third signal sample and the selected portion is either an odd portion or an even portion of the selected portion of the fourth signal sample as selected by the second odd-even switch;

grouping the third product with the fourth product to obtain a second sum; and grouping the first sum with the second sum.

5. The method of claim 3, further comprising:

combining a selected portion of a third signal sample of the plurality of signal samples with a second PN code chip of the plurality of PN code chips to obtain a third product, wherein the third signal sample succeeds the second signal sample;

combining a selected portion of a fourth signal sample of the plurality of signal samples with a third PN code chip of the plurality of PN code chips to obtain a fourth product, wherein the fourth signal sample succeeds the third signal sample and wherein the third PN code chip succeeds the second PN code chip;

grouping the third product with the fourth product to obtain a second sum; and grouping the first sum with the second sum.

6. A computer-readable medium having software for despreading a spread spectrum signal using a PN code, wherein the spread spectrum signal comprises a plurality of signal samples, each signal sample having an in-phase portion and a quadrature-phase portion, and wherein the PN code comprises a plurality of PN code chips, the computer-readable medium comprising:

means for selecting one of the in-phase portion and the quadrature-phase portion of a first signal sample of the plurality of signal samples;

means for selecting one of an even PN code stage and an odd PN code stage from a first PN code chip of the plurality of PN code chips;

means for multiplying the selected portion of the first signal sample with the selected PN code stage to obtain a first product; and means for multiplying the selected portion of a second signal sample of the plurality of signal samples with the first PN code chip to obtain a second product, wherein the second signal sample succeeds the first signal sample; and means for adding the first product with the second product to obtain a first sum.

7. The computer-readable medium of claim 6, further comprising:

means for multiplying a selected portion of a third signal sample of the plurality of signal samples with a second PN code chip of the plurality of PN code chips to obtain a third product, wherein the third signal sample succeeds the second signal sample wherein the second PN code chip succeeds the first PN code chip;

means for multiplying a selected portion of a fourth signal sample of the plurality of signal samples with the second PN code chip to obtain a fourth product, wherein the fourth signal sample succeeds the third signal sample;

means for adding the third product with the fourth product to obtain a second sum; and means for adding the first sum with the second sum.

8. The computer-readable medium of claim 6, further comprising:

means for multiplying a selected portion of a third signal sample of the plurality of signal samples with a second PN code chip of the plurality of PN code chips to obtain a third product, wherein the third signal sample succeeds the second signal sample;

means for multiplying a selected portion of a fourth signal sample of the plurality of signal samples with a third PN code chip of the plurality of PN code chips to obtain a fourth product, wherein the fourth signal sample succeeds the third signal sample and the third PN code chip succeeds the second PN code chip;

means for adding the third product with the fourth product to obtain a second sum; and means for adding the first sum with the second sum.

9. A system for despreading a spread spectrum signal using a PN code, wherein the spread spectrum signal comprises a plurality of signal sample pairs, each signal sample pair comprising an even signal sample and an odd signal sample, each signal sample having an in-phase portion and a quadrature-phase portion, and wherein the PN code comprises a plurality of PN code chips, the system comprising:

a first switch for selecting one of the in-phase portion and the quadrature-phase portion of a first signal sample pair of the plurality of signal sample pairs;

a second switch coupled to the first switch for selecting one of the even sample and the odd sample of the selected portion of the first signal sample pair; and a first multiplier coupled to the second switch for multiplying the selected portion of the selected sample of the first signal sample with a first PN code chip of the plurality of PN code chips to obtain a first product.

10. The system of claim 9, further comprising:
a second multiplier, coupled to the second switch for multiplying a selected portion of the selected sample of a second signal sample pair of the plurality of signal sample pairs with a second PN code chip of the plurality of PN code chips to obtain a second product, wherein the second signal sample pair succeeds the first signal sample pair, and the second PN code chip succeeds the first PN code chip; and
an adder coupled to the first multiplier and the second multiplier for adding the first product with the second product to obtain a first sum.

11. A method for despreading a spread spectrum signal using a PN code in a matched filter, wherein the spread spectrum signal comprises a plurality of signal sample pairs, each signal sample pair comprising an even signal sample and an odd signal sample, each signal sample having an in-phase portion and a quadrature-phase portion, and wherein the PN code comprises a plurality of PN code chips, the method comprising:
selecting one of the in-phase portion and the quadrature-phase portion of a first signal sample pair of the plurality of signal sample pairs;
selecting one of the even sample and the odd sample of the selected portion of the first signal sample pair using an odd-even switch; and
combining the selected portion of the selected sample of the first signal sample pair with a first PN code chip of the plurality of PN code chips to obtain a first product.

12. The method of claim 11, further comprising:
combining a selected portion of the selected sample of a second signal sample pair of the plurality of signal sample pairs with a second PN code chip of the plurality of PN code chips to obtain a second product, wherein the second signal sample pair succeeds the first signal sample pair, and the second PN code chip succeeds the first PN code chip; and
grouping the first product with the second product to obtain a first sum.

13. A computer-readable medium having software for despreading a spread spectrum signal using a PN code, wherein the spread spectrum signal comprises a plurality of signal sample pairs, each pair comprising an even signal sample and an odd signal sample, each signal sample having an in-phase portion and a quadrature-portion, and wherein the PN code comprises a plurality of PN code chips, the computer-readable medium comprising:
means for selecting one of the in-phase portion and the quadrature-phase portion of a first signal sample pair of the plurality of signal sample pairs;
means for selecting one of the even sample and the odd sample of the selected portion of the first signal sample pair; and
means for multiplying the selected portion of the selected sample of the first signal sample pair with the first PN code chip to obtain a first product.

14. The computer-readable medium of claim 13, further comprising:
means for multiplying the selected portion of the selected sample of a second signal sample pair of the plurality of signal sample pairs with a second PN code chip of the plurality of PN code chips to obtain a second product, wherein the second signal sample pair succeeds the first signal sample pair, and the second PN code chip succeeds the first PN code chip; and
means for adding the first product with the second product to obtain a first sum.

* * * * *

UNITED STATES PATENT AND TRADEMARK OFFICE
CERTIFICATE OF CORRECTION

PATENT NO. : 7,711,038 B1  
APPLICATION NO. : 09/604595  
DATED : May 4, 2010  
INVENTOR(S) : Underbrink et al.

Page 1 of 2

It is certified that error appears in the above-identified patent and that said Letters Patent is hereby corrected as shown below:

Title Page, Item (75), under "Inventors", in Column 1, Line 2, delete "Gronemyer," and insert -- Gronemeyer, --, therefor.

Title Page, Item (63), under "Related U.S. Application Data", in Column 1, Line 1, delete "Continuation of application" and insert -- Continuation in part --, therefor.

IN THE SPECIFICATION

In Column 1, Line 41, delete "iii" and insert -- in --, therefor.

In Column 2, Line 27, delete ""RF"" and insert -- "IF" --, therefor.

In Column 4, Line 31, delete "L" and insert -- a --, therefor.

In Column 5, Line 19, delete "OPS-oriented devices Include" and insert -- GPS-oriented devices include --, therefor.

In Column 5, Line 21, delete "Tnc.," and insert -- Inc., --, therefor.

In Column 8, Line 64, delete "Pith" and insert -- Path --, therefor.

In Column 10, Line 63, delete "-1" and insert -- +1 --, therefor.

In Column 14, Line 34, delete "(1, Q)." and insert -- (I, Q). --, therefor.

In Column 14, Line 73, delete "MS seg; ++" and insert -- MS; seg++ --, therefor.

In Column 15, Line 16, below "for(half_chip = 0;..........." insert -- { --.

Signed and Sealed this  
Thirtieth Day of April, 2013

Teresa Stanek Rea  
*Acting Director of the United States Patent and Trademark Office*

CERTIFICATE OF CORRECTION (continued)
U.S. Pat. No. 7,711,038 B1

In Column 15, Line 43, delete "0" and insert -- 0; --, therefor.

In Column 15, Line 54, delete "he" and insert -- be --, therefor.

In Column 15, Line 76, delete "arid" and insert -- and --, therefor.

In Column 17, Line 55, delete "100" and insert -- 1100 --, therefor.

In Column 17, Line 60, delete "100" and insert -- 1100 --, therefor.

In Column 19, Line 20, delete "OPS" and insert -- GPS --, therefor.

In Column 20, Line 8, delete "CPS" and insert -- GPS --, therefor.

In Column 21, Line 11, delete "in" and insert -- an --, therefor.

IN THE CLAIMS

In Column 22, Line 41, in Claim 1, delete "a switch" and insert -- the switch --, therefor.

In Column 25, Line 3, in Claim 9, delete "sample" and insert -- sample pair --, therefor.

In Column 25, Line 6, in Claim 10, delete "multiplier," and insert -- multiplier --, therefor.